(12) United States Patent
Sawada

(10) Patent No.: US 12,455,707 B2
(45) Date of Patent: Oct. 28, 2025

(54) INFORMATION PROCESSING APPARATUS, METHOD, AND NON-TRANSITORY COMPUTER-READABLE STORAGE MEDIUM STORING PROGRAM

(71) Applicant: CANON KABUSHIKI KAISHA, Tokyo (JP)

(72) Inventor: Hideharu Sawada, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/414,591

(22) Filed: Jan. 17, 2024

(65) Prior Publication Data

US 2024/0264782 A1    Aug. 8, 2024

(30) Foreign Application Priority Data

Feb. 2, 2023    (JP) .................................. 2023-014859

(51) Int. Cl.
*G06F 3/12*    (2006.01)
(52) U.S. Cl.
CPC .......... *G06F 3/1225* (2013.01); *G06F 3/1204* (2013.01); *G06F 3/1208* (2013.01); *G06F 3/1254* (2013.01)

(58) Field of Classification Search
None
See application file for complete search history.

(56) References Cited

U.S. PATENT DOCUMENTS

| 11,650,776 | B2 | 5/2023 | Narita | |
|---|---|---|---|---|
| 2016/0170687 | A1* | 6/2016 | Otsuka | G06F 3/1285 358/1.15 |
| 2021/0200492 | A1* | 7/2021 | Kawasaki | G06F 3/1204 |

FOREIGN PATENT DOCUMENTS

JP    2022-100565 A    7/2022

\* cited by examiner

*Primary Examiner* — Frantz Bataille
(74) *Attorney, Agent, or Firm* — VENABLE LLP

(57) ABSTRACT

An information processing apparatus acquires print function information for allowing a user to designate a function of a printing apparatus, edits the acquired print function information, and generates, based on the edited print function information, print setting information for executing the function designated by the user. In addition, information of a print medium is stored and added to the acquired print function information. The print medium includes roll paper, and added to the acquired print function information is information of roll paper having a width smaller than a maximum width of paper included in the acquired print function information in the stored information of the roll paper.

22 Claims, 16 Drawing Sheets

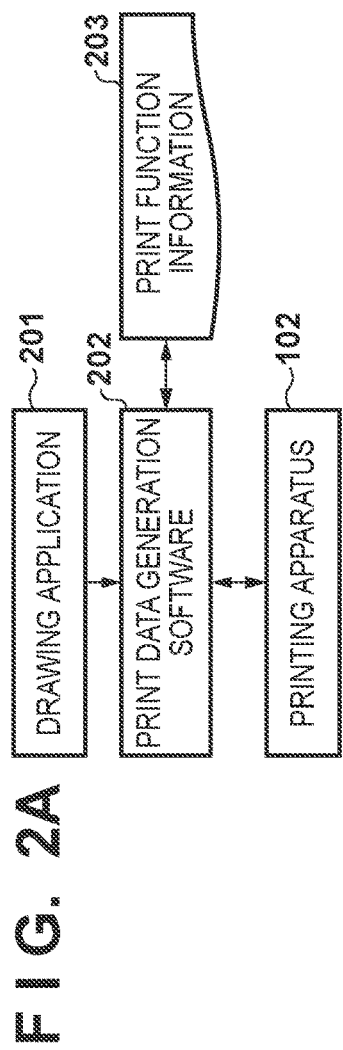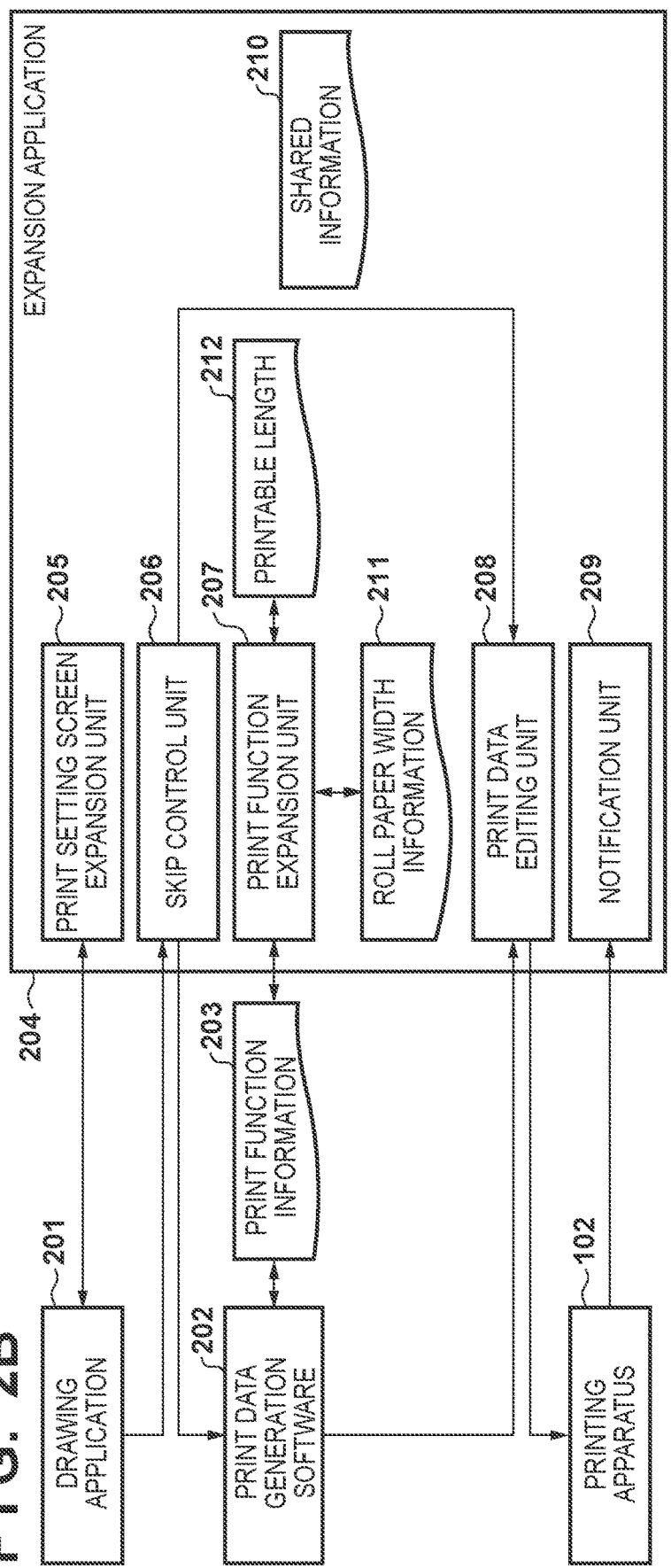
FIG. 2A
FIG. 2B

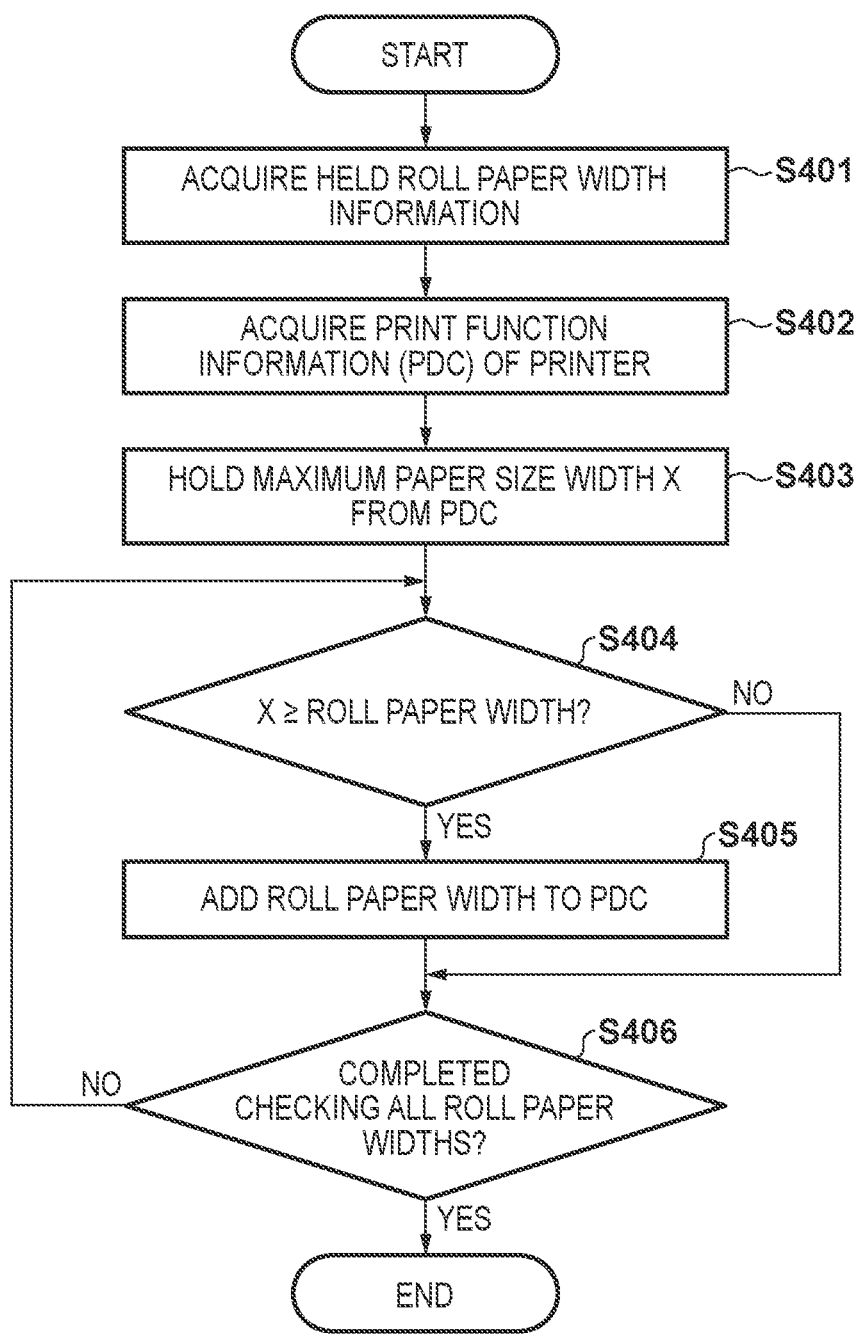

F I G. 5

```xml
<?xml version="1.0" encoding="utf-8"?>
<PrintDeviceCapabilities...>
...
<psk:PageMediaSize psf2:psftype="Feature">    502
  <psk:ISOA4 psf2:psftype="Option" psf2:default="true">
    <psk12:PortraitImageableSize...>0,0,210000,297000</psk12:PortraitImageableSize>
    <psk:MediaSizeHeight xsi:type="xsd:integer" psf2:psftype="ScoredProperty">297000</psk:MediaSizeHeight>
    <psk:MediaSizeWidth xsi:type="xsd:integer" psf2:psftype="ScoredProperty">210000</psk:MediaSizeWidth>
  </psk:ISOA4>
...
  <psk:Poster44x64 psf2:psftype="Option">    503
    <psk12:PortraitImageableSize...>0,0,1117600,1574800</psk12:PortraitImageableSize>
    <psk:MediaSizeHeight xsi:type="xsd:integer" psf2:psftype="ScoredProperty">1574800</psk:MediaSizeHeight>
    <psk:MediaSizeWidth xsi:type="xsd:integer" psf2:psftype="ScoredProperty">1117600</psk:MediaSizeWidth>
  </psk:Poster44x64>
</psk:PageMediaType psf2:psftype="Feature">
  <psk:Plain psf2:psftype="Option" psf2:default="true"/>
  <psk:Photographic psf2:psftype="Option" psf2:default="false"/>
</psk:PageMediaType>
<psk:PageOrientation psf2:psftype="Feature">    504
  <psk:Portrait psf2:psftype="Option" psf2:default="true"/>
  <psk:Landscape psf2:psftype="Option" psf2:default="false"/>
</psk:PageOrientation>
...
</PrintDeviceCapabilities>
```

FIG. 6

```
<?xml version="1.0" encoding="utf-8"?>                                          ⎫
<PrintDeviceCapabilities...>                                                    │ 601
...                                                                             │
<psk:PageMediaSize psf2:psftype="Feature">                                      │
  <psk:ISOA4 psf2:psftype="Option" psf2:default="true">                         │
    <psk12:PortraitImageableSize...>0,0,210000 297000</psk12:PortraitImageableSize>
    <psk:MediaSizeHeight xsi:type="xsd:integer" psf2:psftype="ScoredProperty">297000</psk:MediaSizeHeight>
    <psk:MediaSizeWidth xsi:type="xsd:integer" psf2:psftype="ScoredProperty">210000</psk:MediaSizeWidth>
  </psk:ISOA4>
...
  <psk:Poster44x64 psf2:psftype="Option">
    <psk12:PortraitImageableSize...>0,0,1117600,1574800</psk12:PortraitImageableSize>
    <psk:MediaSizeHeight xsi:type="xsd:integer" psf2:psftype="ScoredProperty">1574800</psk:MediaSizeHeight>
    <psk:MediaSizeWidth xsi:type="xsd:integer" psf2:psftype="ScoredProperty">1117600</psk:MediaSizeWidth>
  </psk:Poster44x64>
</psk:PageMediaType psf2:psftype="Feature">
  <psk:Plain psf2:psftype="Option" psf2:default="true"/>
  <psk:Photographic psf2:psftype="Option" psf2:default="false"/>
</psk:PageMediaType>
<psk:PageOrientation psf2:psftype="Feature">
  <psk:Portrait psf2:psftype="Option" psf2:default="true"/>
  <psk:Landscape psf2:psftype="Option" psf2:default="false"/>
</psk:PageOrientation>
...                                                                             ⎫
<psk:JobRollWidth psf2:psftype="Feature">                                       │
  <ns0000:Roll44inch psf2:psftype="Option" psf2:default="false"/>               │ 602
  <ns0000:Roll42inch psf2:psftype="Option" psf2:default="false"/>               │
  <ns0000:Roll24inch psf2:psftype="Option" psf2:default="true"/>                ⎭
...
</PrintDeviceCapabilities>
```

FIG. 7
| ROLL PAPER WIDTH | ROLL PAPER WIDTH PDC (PC) |
|---|---|
| 60 in ROLL | Roll 60 inch |
| 54 in ROLL | Roll 54 inch |
| 44 in ROLL | Roll 44 inch |
| 42 in ROLL | Roll 42 inch |
| 36 in ROLL | Roll 36 inch |
| 24 in ROLL | Roll 24 inch |
| 600 mm ROLL | Roll 600 mm |
| 20 in ROLL | Roll 20 inch |
| ... | ... |
FIG. 8
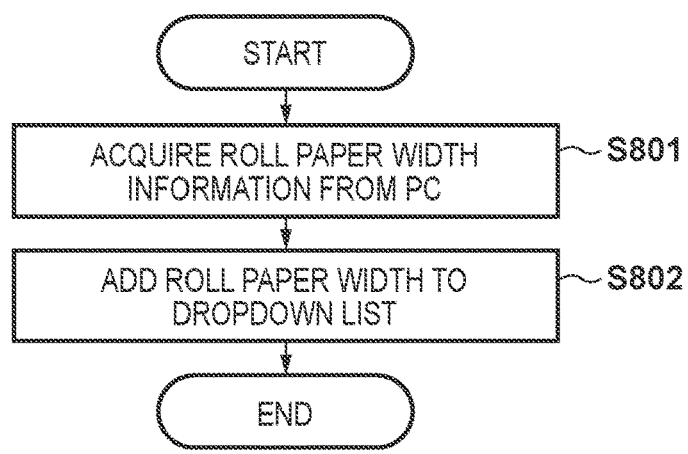
FIG. 9A
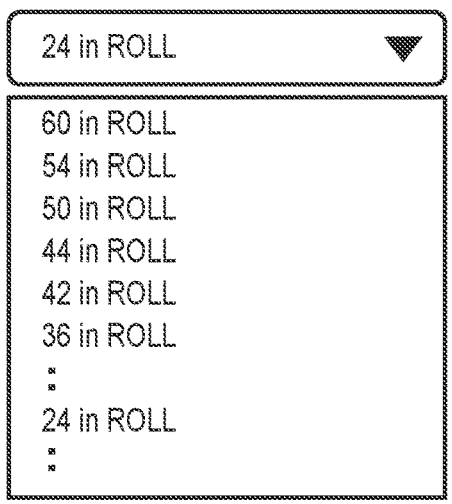
FIG. 9B
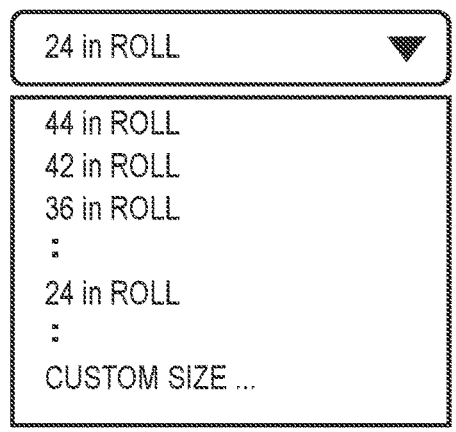

FIG. 10A

PRINT SETTING

- 1001 — TYPE OF PAPER: PLAIN PAPER
- 1002 — PAPER SIZE: A4  [BORDERLESS SETTING]
- 1003 — ☐ BORDERLESS PRINTING

ENLARGED/REDUCED PRINTING:
- 1004 — ○ FIT OUTPUT PAPER SIZE
- 1005 — ● SCALE TO FIT ROLL PAPER WIDTH
- 1006 — ○ DESIGNATE SCALE [ 0 ] %

- 1007 — OUTPUT PAPER SIZE: AUTOMATIC
- 1008 — ROLL PAPER WIDTH: 24 in ROLL

[OK] [Cancel]

FIG. 10B

PRINT SETTING

- TYPE OF PAPER: PLAIN PAPER
- PAPER SIZE: A4  [BORDERLESS SETTING] — 1009
- ☑ BORDERLESS PRINTING

BORDERLESS PRINTING METHOD
- 1010 — ○ FIT OUTPUT PAPER SIZE
- 1011 — ● SCALE TO FIT ROLL PAPER WIDTH
- 1012 — ○ PRINT IMAGE IN FULL SCALE

- OUTPUT PAPER SIZE: AUTOMATIC
- ROLL PAPER WIDTH: 24 in ROLL — 1013

[OK] [Cancel]

INFORMATION PROCESSING APPARATUS, METHOD, AND NON-TRANSITORY COMPUTER-READABLE STORAGE MEDIUM STORING PROGRAM

BACKGROUND OF THE INVENTION

Field of the Invention

The present invention relates to an information processing apparatus, a method, and a non-transitory computer-readable storage medium storing a program.

Description of the Related Art

There is known an arrangement that issues a print instruction to a printing apparatus connected to a host computer using a printer driver that is installed in the host computer as the control software of the printing apparatus. An Operating System (OS) that is basic software is installed in the host computer. The printer driver is configured in accordance with specifications defined by the OS, and is invoked from the OS to operate. A vender that provides a printing apparatus provides a printer driver suitable for the specifications of the OS, thereby providing an arrangement for instructing the printing apparatus to perform printing using the OS.

In recent years, in Windows®, a standard class driver (to be also referred to as a "standard driver" hereinafter) that is commonly usable by printing apparatuses provided by a plurality of vendors is provided. The standard driver is packaged together with the OS and can easily be used by connecting an arbitrary printing apparatus to a host computer. Hence, it is not necessary to separately install a printer driver that is suitable for a printing apparatus and unique to the model, resulting in high convenience. In addition, the standard driver is configured to designate a print function in accordance with PrintDeviceCapabilities (to be referred to as "PDC" hereinafter) generated based on information acquired from the connected printing apparatus. This allows a user using the standard driver to designate a print function according to the capability of the connected printing apparatus using one standard driver.

A function expansion application (to be also referred to as an "expansion application" hereinafter) can be associated with the standard driver. The expansion application can be provided by a vendor that provides a printing apparatus. The expansion application edits a PDC generated by the standard driver, thereby providing a function (expanded function) that cannot be implemented only by the standard driver. Japanese Patent Laid-Open No. 2022-100565 describes a technique of determining the appropriateness of paper by comparing paper information acquired from a printer with paper information at the time of print setting by an expansion application.

SUMMARY OF THE INVENTION

It is necessary to further improve user convenience in a function for expanding the function of a printer driver.

The present invention provides an information processing apparatus for improving user convenience when expanding the function of a printer driver, a method, and a non-transitory computer-readable storage medium storing a program.

The present invention in one aspect provides an information processing apparatus comprising: at least one memory and at least one processor which function as: an acquisition unit configured to acquire print function information for allowing a user to designate a function of a printing apparatus; a first editing unit configured to edit the print function information acquired by the acquisition unit; and a generation unit configured to generate, based on the print function information edited by the first editing unit, print setting information for executing the function designated by the user.

According to the present invention, it is possible to improve user convenience when expanding the function of a printer driver.

Further features of the present invention will become apparent from the following description of exemplary embodiments with reference to the attached drawings.

BRIEF DESCRIPTION OF THE DRAWINGS

FIGS. 2A and 2B are block diagrams each showing the software arrangement of the print system;

FIG. 4 is a flowchart illustrating processing by a print function expansion unit;

FIG. 5 is a view showing a PDC;

FIG. 6 is a view showing a PDC;

FIG. 7 is a table showing roll paper width information included in an expansion application;

FIG. 8 is a flowchart illustrating processing by a print setting screen expansion unit;

FIGS. 9A and 9B are views each showing display by the print setting screen expansion unit;

FIGS. 10A and 10B are views each showing display by the print setting screen expansion unit;

DESCRIPTION OF THE EMBODIMENTS

Figure 1:
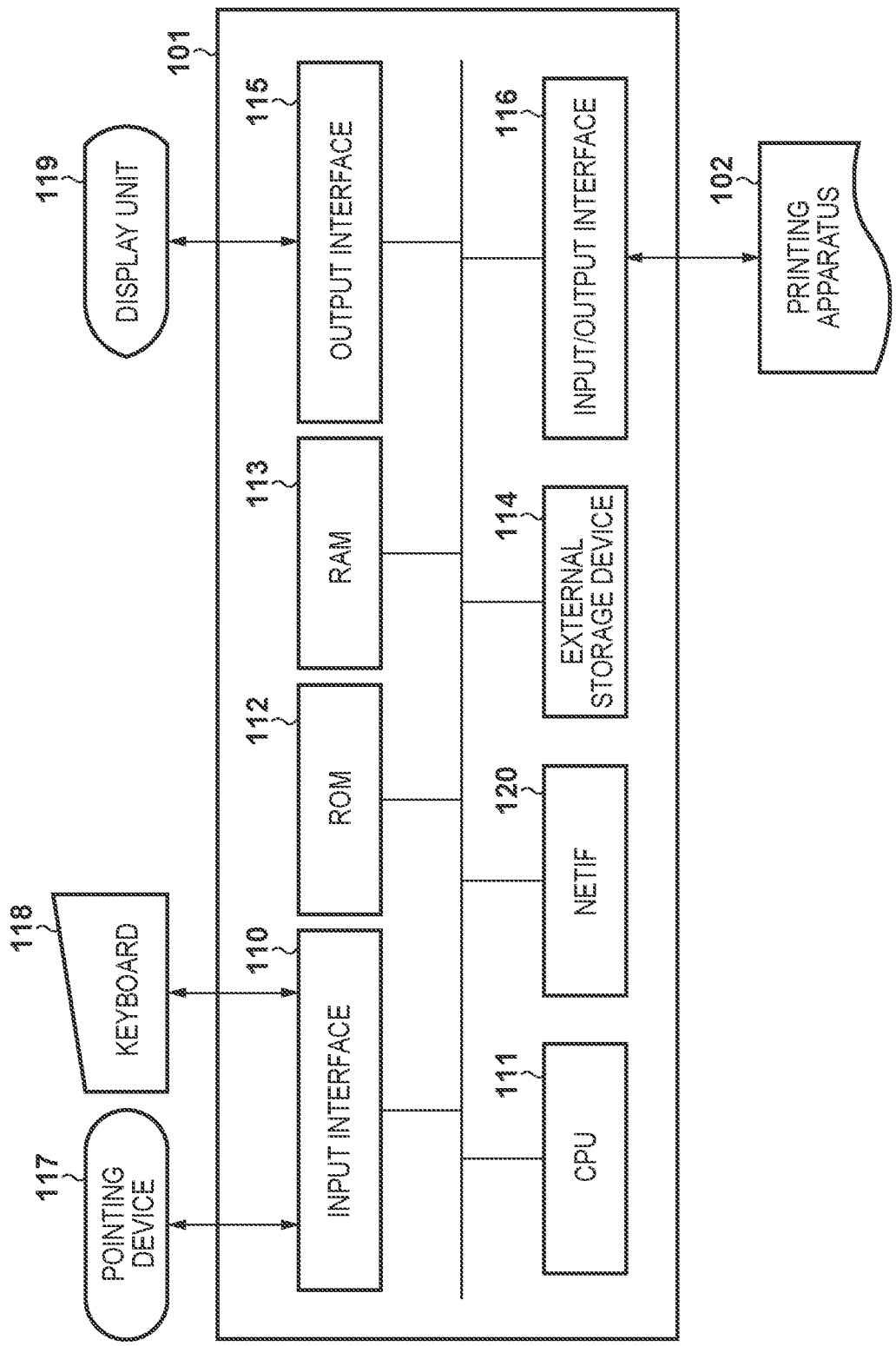
FIG. 1 is a block diagram showing the hardware arrangement of a print system.

Hereinafter, embodiments will be described in detail with reference to the attached drawings. Note, the following embodiments are not intended to limit the scope of the claimed invention. Multiple features are described in the embodiments, but limitation is not made of an invention that requires all such features, and multiple such features may be combined as appropriate. Furthermore, in the attached drawings, the same reference numerals are given to the same or similar configurations, and redundant description thereof is omitted.

First Embodiment

FIG. 1 is a block diagram showing the hardware arrangement of a print system. In FIG. 1, a host computer 101 is an example of an information processing apparatus, and includes an input interface 110, a CPU 111, a ROM 112, a RAM 113, an external storage device 114, an output interface 115, and an input/output interface 116. An input device such as a keyboard 118 or a pointing device 117 is connected to the input interface 110, and a display device such as a display unit 119 is connected to the output interface 115. A NETIF 120 is a network interface and performs control to transfer data to/from an external apparatus via a network.

An initialization program is stored in the ROM 112. The external storage device 114 stores an application program group, an Operating System (OS), print data generation software, and various kinds of data. The RAM 113 is used as a work memory when executing various kinds of programs stored in the external storage device 114, and the various kinds of programs can operate in the host computer 101.

Note that in this embodiment, the CPU 111 performs processing in accordance with the procedure of a program stored in the ROM 112, thereby executing processing according to a function (to be described later) in the host computer 101 and a flowchart (to be described later). A printing apparatus 102 that is a device is connected to the host computer 101 via the input/output interface 116. Here, the host computer 101 and the printing apparatus 102 are separately formed. However, these may be formed as one information processing apparatus. Note that as the printing apparatus, an inkjet printer configured to perform printing by discharging ink onto a print surface will be described as an example. However, printing may be executed by another method (for example, an electrophotographic method). In addition, as the host computer 101, a desktop personal computer, a smartphone, or a laptop may be used. In a case where the host computer 101 and the printing apparatus 102 are connected via a network, the network can be any of a wired network, a wireless network, and a network including both. The network may include an apparatus different from the host computer 101 and the printing apparatus 102, for example, a router operating as an access point.

FIGS. 2A and 2B are block diagrams each schematically showing the arrangement of the print system by focusing on software. A description will be provided assuming a print system using the host computer 101 in which Windows®10 of Microsoft® is installed as an OS. FIG. 2A is a block diagram showing a general arrangement in a case where an expansion application 204 is not associated with print data generation software 202 and the printing apparatus 102.

A drawing application 201 is software that creates a content (drawing data) to be printed. For example, this corresponds to a document creation application or a spreadsheet application. Upon receiving a print request from a user, the drawing application 201 issues a print instruction to the OS. The print instruction includes print setting information used to instruct the operations of the print data generation software 202 and the printing apparatus 102. The print setting information will also be referred to as a Print Ticket (to be referred to as a "PT" hereinafter).

To output the print setting information, the drawing application 201 can display a print setting screen provided by one of the print data generation software 202, the OS, and the drawing application 201. The print setting screen includes a setting item (to be also referred to as a "control item" hereinafter) representing a print function settable in accordance with capability information (information settable as a print setting) acquired from the print data generation software 202, and a control item indicating its set value. The capability information will also be referred to as Print Capabilities (to be referred to as "PC" hereinafter). The print data generation software 202 decides the PC based on print function information 203. The print function information 203 is data representing print functions, in which all settable print functions, set values thereof, and the exclusive relationship between the set values are described. The print function information 203 will also be referred to as Print Device Capabilities (PDC). The print function information 203 is included in the configuration file of the print data generation software 202 and arranged as an unchangeable file in the external storage device 114. Alternatively, the print function information 203 may be generated dynamically by the print data generation software 202. More specifically, the print data generation software 202 or the OS can be configured to acquire, from the printing apparatus 102, attribute data of the printing apparatus and generate the print function information 203 in accordance with the attribute information in the acquired attribute data. Note that if the print function information 203 is dynamically generated, the generated print function information 203 can be edited. The attribute data of the printing apparatus, which is acquired from the printing apparatus 102, is a response acquired by issuing a Get-Printer-Attributes operation of the Internet Print Protocol (IPP) to the printing apparatus 102. The response includes attribute information representing the functions that can be designated in the printing apparatus 102 (the capabilities of the printing apparatus) and set values associated with the attribute information. This response is stored in the RAM 113.

With this arrangement, the print data generation software 202 can be configured such that the user can designate a print function usable in each printing apparatus 102 in accordance with the connected printing apparatus 102. That is, even if a printing apparatus having a different function or a printing apparatus developed by a different vendor is connected, the print data generation software 202 can be configured such that the user can designate a usable print function in accordance with the connected printing apparatus. Note that an arrangement using IPP Class Driver included in Windows® 10 as an example of the print data generation software 202 will be described here. The IPP Class Driver is a printer driver that executes print processing in accordance with the specifications of a standard print protocol called Internet Print Protocol (IPP) and is packaged together with the OS. The IPP Class Driver is not a unique printer driver according to the model of the printing apparatus 102 but a standard class driver commonly usable by a plurality of printing apparatuses. The IPP Class Driver acquires the capability information of the connected printing apparatus 102 and generates the print function information 203 based on the information such that the user can designate a print function supported by the connected printing apparatus 102.

Based on the print instruction output from the drawing application 201, the OS generates intermediate data (also called input data) and transfers it to the print data generation software 202. Note that the data output by the drawing application 201 for printing is data in the Graphic Device Interface format (data in the GDI format) or data in the XML Paper Specification format (data in the XPS format). Assume that the IPP Class Driver is used as the print data generation software 202. In this case, if the data output from the drawing application 201 is data in the GDI format, the OS converts the data in the GDI format output from the drawing application 201 into data in the XPS format. Then, the OS transfers the converted data in the XPS format as intermediate data to the print data generation software 202. If the data output from the drawing application 201 is data in the XPS format, the OS transfers the data in the XPS format as intermediate data to the print data generation software 202. Note that the intermediate data includes drawing data that is the information of a picture to be formed on a paper surface as a print medium and print setting information set by the user. Note that this embodiment will describe print paper as an example of the print medium.

The print data generation software 202 converts the acquired intermediate data into print data interpretable by the printing apparatus 102, and transmits the print data to the printing apparatus 102. Note that the print data includes the drawing data that is the information of the picture to be formed on a paper surface and print setting attribute information (attribute information that designates print settings) generated based on the print setting information set by the user. The print setting attribute information includes attribute information representing functions that can be designated in the printing apparatus 102 (the capabilities of the printing apparatus) and set values associated with the attribute information.

The printing apparatus 102 performs printing on a paper surface based on the print data sent from the print data generation software 202. At this time, the printing apparatus 102 forms the drawing data included in the print data on the paper surface by an operation according to the print setting attribute information included in the print data. The print setting attribute information includes attribute information for designating print quality (image quality priority, speed priority, or the like), double-sided printing, and the like and set values thereof. For example, if the print setting attribute information includes attribute information for designating double-sided printing, the printing apparatus 102 executes double-sided printing.

FIG. 2B is a block diagram showing an arrangement in a case where the expansion application 204 is associated with the print data generation software 202 and the printing apparatus 102. Note that components and processes which are not particularly mentioned below are the same as in FIG. 2A.

The expansion application 204 is software configured to expand the function of the print data generation software 202, and is software that is not included (packaged) in the OS in advance. For this reason, the user operates the host computer 101 to download the expansion application 204 from a server via the Internet and install it. Alternatively, the expansion application 204 may automatically be installed based on connection of the printing apparatus 102 to the host computer 101. More specifically, if the printing apparatus 102 is connected to the host computer 101, the OS acquires device identification information from the printing apparatus 102. The OS may download the expansion application 204 corresponding to the acquired device identification information from a server via the Internet and install it. That is, the print data generation software 202 and the expansion application 204 are held as separate files in the host computer 101.

Note that the print data generation software 202 and the expansion application 204 are sometimes updated and upgraded, but the updating processes are performed at different timings. That is, the timing of acquiring the print data generation software 202 by the host computer 101 and the timing of acquiring the expansion application 204 are different. In addition, the trigger to acquire the print data generation software 202 by the host computer 101 and the trigger to acquire the expansion application 204 are also different. Note that if the expansion application 204 is installed, the OS associates the expansion application 204 with the print data generation software 202 and the printing apparatus 102.

The expansion application 204 according to this embodiment includes a print setting screen expansion unit 205, a skip control unit 206, a print function expansion unit 207, a print data editing unit 208, and a notification unit 209. In addition, the expansion application 204 includes shared information 210 that can commonly be accessed from the units. The substance of the shared information 210 is, for example, a file stored in the external storage device 114 or information stored in the RAM 113. Using an Application Program Interface (API) provided by the OS, the expansion application 204 writes or reads information in or from the shared information 210. Furthermore, the expansion application 204 includes roll paper width information 211. The roll paper width information 211 is information of the roll paper widths of all the printers supported by the expansion application 204. The expansion application 204 also holds a length 212 printable by the printer. Note that the length 212 printable by the printer is the length of the roll paper in the conveyance direction. In this embodiment, assume that the length is 18,000 mm as an example. Note that if the print function information 203 acquired from the printing apparatus 102 includes information representing the printable length, the expansion application 204 can directly use the information included in the print function information 203 without using the printable length 212.

FIG. 7 is a table showing an example of the roll paper width information 211 included in the expansion application 204. The expansion application 204 according to this embodiment holds a plurality of pieces of roll paper width information up to "60 in roll" (roll paper with a 60-inch width). As other roll paper width information, for example, "54 in roll" (roll paper with a 54-inch width) is held. A roll paper width name 701 is used in a print setting screen displayed by the expansion application 204. Furthermore, a name 702 is a roll paper width name used in a PDC or a PC. Note that in this embodiment, the roll paper width is represented in units of 1/1000 mm.

Although details will be described later, in a case where the expansion application 204 operates in association with the printing apparatus 102, it is possible to determine a roll paper width supported by the printing apparatus 102 based on the roll paper width information 211 and the print function information 203 acquired from the printing apparatus 102. Note that in a case where the expansion application 204 operates in association with the printing apparatus 102, the print function information 203 acquired from the printing apparatus 102 may already include roll paper width information. In this case, it is possible to directly use the information included in the print function information 203 without using the roll paper width information 211. Note that the expansion application 204 may end the operation every time the processing of each unit ends. In this case, the OS activates the expansion application 204 every time a request to use each unit is received. Furthermore, another form may be adopted. For example, if the processing of the print setting screen expansion unit 205 ends, the OS ends the operation of the expansion application 204. However, even if the processing of the skip control unit 206 ends, the OS may keep the expansion application 204 activated. Furthermore, the expansion application 204 may cancel the processing in the processing of each unit. If the processing is canceled, a job in progress on a print queue is deleted by the OS.

Upon receiving a print request from the user, the drawing application 201 issues a print instruction to the OS. In this arrangement as well, the drawing application 201 can display the print setting screen, similar to the arrangement shown in FIG. 2A. In this arrangement, the print setting screen provided by the expansion application 204 is displayed. More specifically, the print setting screen provided by the print setting screen expansion unit 205 included in the expansion application 204 is displayed. Note that whether the print setting screen provided by the print setting screen expansion unit 205 is displayed depends on the operation of the user.

Furthermore, if the drawing application 201 accepts the print request from the user, and a print instruction is issued to the OS, the OS activates the skip control unit 206. The skip control unit 206 performs control concerning whether to skip the processing of the print data generation software 202. The skip control unit 206 does not acquire the intermediate data or the print setting information. After the skip control processing of the skip control unit 206, the OS generates intermediate data based on the print instruction output from the drawing application 201, and transfers the intermediate data to the print data generation software 202. Here, if skip control is not performed by the skip control unit 206, the intermediate data is processed by the print data generation software 202 into print data interpretable by the printing apparatus 102, and transferred to the print data editing unit 208. On the other hand, if skip of the print data generation software 202 is performed, the intermediate data is transferred to the print data editing unit 208 without being processed by the print data generation software 202. Thus, the intermediate data can be processed by the print data editing unit 208. An example of a case where the print data generation software 202 is skipped is a case where the print data editing unit 208 preferably performs enlargement/reduction processing. The intermediate data can hold data as vector data, and is hardly degraded at the time of enlargement/reduction. Therefore, in a form that the print data generation software 202 outputs an image as raster data, the processing of the print data generation software 202 may be skipped and the print data editing unit 208 may process the intermediate data. The print data editing unit 208 performs editing of the intermediate data transferred from the print data generation software 202 or the print data processed by the print data generation software 202. As the editing contents, for example, in a case of "enlargement to the roll paper width", the print data editing unit 208 changes a scale based on the print setting information of "enlargement to the roll paper width" received from the OS and the information of the width of the actually fed roll paper acquired from the printing apparatus 102. Furthermore, the print data editing unit 208 can display a UI screen on the display unit 119, and can display the layout result of the intermediate data or the print data as a preview screen. After the print data editing unit 208 edits the print data, the print data is transferred to the printing apparatus 102 via the OS. The printing apparatus 102 performs printing on a paper surface based on the received print data. Note that if the print data generation software 202 is skipped by the skip control unit 206, the print data editing unit 208 may convert the received intermediate data into print data interpretable by the printing apparatus 102.

The expansion application 204 includes the print function expansion unit 207. The print function expansion unit 207 can edit the print function information 203 (PDC) generated by the print data generation software 202 or the OS. The print function expansion unit 207 can thus add a function provided by the expansion application 204, and add a function supported by the printing apparatus 102 but not by the print data generation software 202. In addition, the print function expansion unit 207 can add an exclusive relationship between the set values of print functions. The OS activates the print function expansion unit 207 when the expansion application 204 is associated with the printing apparatus 102 and the print data generation software 202 for the first time. Furthermore, the OS may activate the print function expansion unit 207 at another timing such as the activation timing of the OS. This allows the print function expansion unit 207 to detect an expanded function and add it to the print function information 203 in a case where an optional device is added later to the printing apparatus 102, and the function associated with printing is expanded. Note that the optional device is, for example, a two-level roll unit or a finisher.

In addition, the expansion application 204 includes the notification unit 209. The notification unit 209 can display a notification to the user in response to the occurrence of an error in the printing apparatus 102. For example, if a paper-out error occurs in the printing apparatus 102, the print data generation software 202 detects it, and the OS displays a message on the display unit 119 using a notification function called a toast notification that is a function of the OS. When the user presses the toast notification, the notification unit 209 of the expansion application 204 is invoked by the OS, and the UI screen of the notification unit 209 is displayed. On the UI screen of the notification unit 209, for example, a detailed message of the paper-out error or a paper filling method can be displayed.

Note that the arrangement of the expansion application 204 for implementing this embodiment is not limited to an arrangement including all the above-described functions (units), and may have only some of the functions or may have other functions. The expansion application 204 will sometimes simply be referred to as print software. As described above, it can be said that the expansion application 204 has at least one of functions to be described below:

a function of displaying a setting screen (the print setting screen expansion unit 205)

a function of controlling whether to skip the processing of the print data generation software 202 (the skip control unit 206)

a function of editing print data to be transmitted to the printing apparatus 102 (the print data editing unit 208)

a function of expanding a function that can be designated by the print data generation software 202 (the print function expansion unit 207)

a function of displaying a screen in response to the occurrence of an error in the printing apparatus 102 (the notification unit 209).

The print data generation software 202 acquires the capability information from the printing apparatus 102, and determines the format of print data supported by the printing apparatus 102. This allows the print data generation software 202 to generate print data interpretable by the printing apparatus 102. Note that a portion to be described below as the format of print data may actually indicate the format of drawing data included in the print data.

Figure 3A:
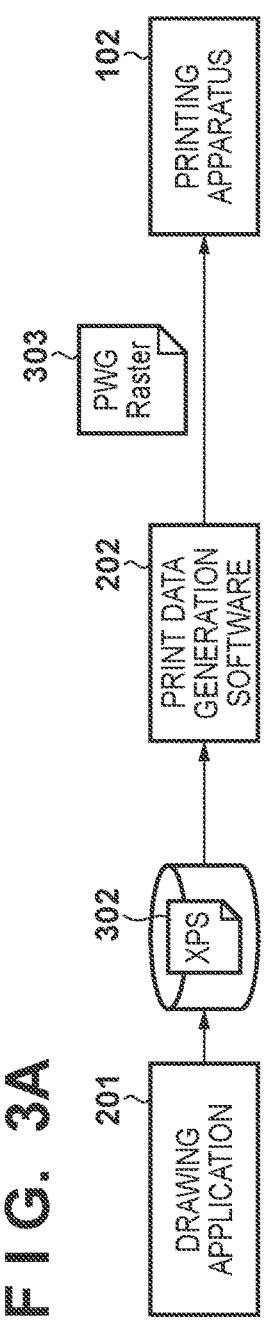
FIGS. 3A to 3C are views each showing a data format processed by the print system.
Figure 3B:
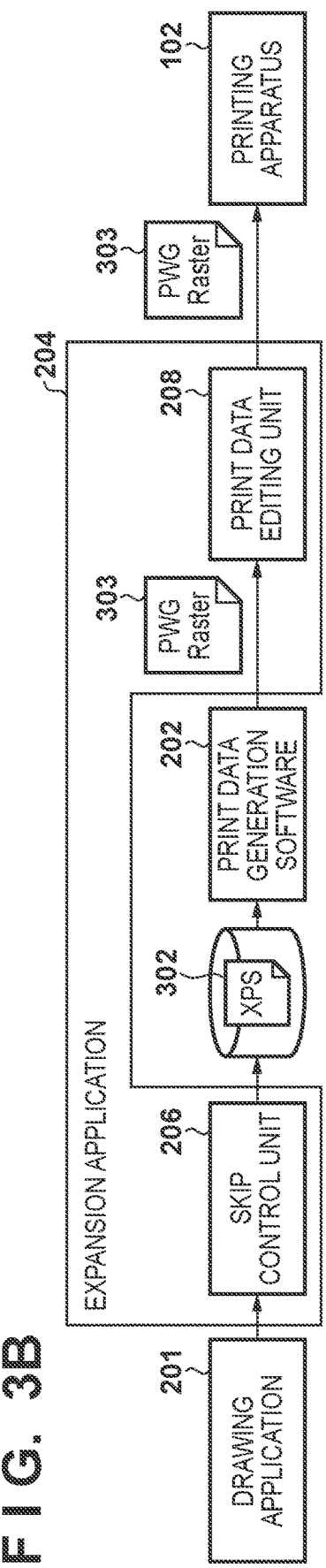
Figure 3C:
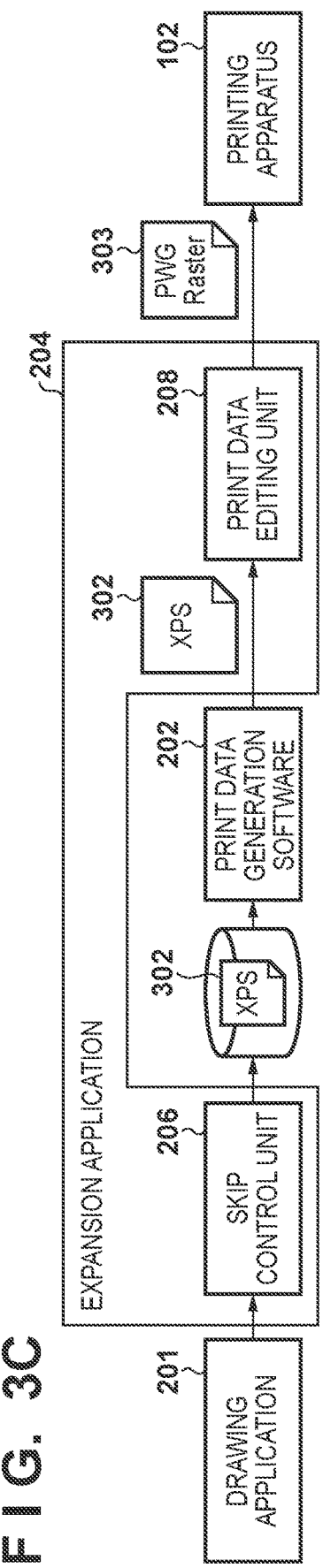

FIGS. 3A to 3C are views each showing a data format processed by each part of the print system according to this embodiment. FIG. 3A is a view showing a data format processed by each part of the print system in a case where the expansion application 204 is not associated. Upon receiving the print instruction from the drawing application 201, the OS generates XPS data 302 as intermediate data. The print data generation software 202 converts the XPS data 302 into print data interpretable by the printer. The print data generation software 202 determines the supported format of print data based on the attribute data acquired from the printing apparatus 102, and generates print data interpretable by the corresponding printing apparatus 102. The format of the print data may be PDF or PWG Raster but is not limited to them. In this embodiment, as the format of the print data supported by the printing apparatus 102, PWG Raster is used. Therefore, the print data generation software 202 converts the XPS data 302 into PWG Raster data 303, and transmits the data to the printing apparatus 102. The printing apparatus 102 performs printing based on the received PWG Raster data 303.

FIG. 3B is a view showing a data format processed by each part of the print system in a case where the expansion application 204 is associated and a skip instruction of print data generation processing by the print data generation software 202 is not issued. Upon receiving the print instruction from the drawing application 201, the skip control unit 206 of the expansion application 204 is invoked. However, in FIG. 3B, the skip control unit 206 does not instruct to skip the processing of the print data generation software 202. This causes the print data generation software 202 to convert the XPS data 302 into the PWG Raster data 303, similar to the case shown in FIG. 3A. The print data editing unit 208 receives the PWG Raster data 303 as input data. Since the PWG Raster data 303 is print data interpretable by the printing apparatus 102, the print data editing unit 208 directly sends the PWG Raster data 303 as input data to the printing apparatus 102. The printing apparatus 102 performs printing based on the received PWG Raster data 303.

FIG. 3C is a view showing a data format processed in a case where the expansion application 204 is associated and a skip instruction of print data generation processing by the print data generation software 202 is issued. Upon receiving the print instruction from the drawing application 201, the skip control unit 206 of the expansion application 204 is invoked. The skip control unit 206 issues, to the OS or the print data generation software 202, an instruction not to execute processing of converting the intermediate data into print data. Upon receiving the skip instruction from the skip control unit 206, the print data generation software 202 transfers the intermediate data to the print data editing unit 208 of the expansion application 204 without converting the intermediate data into print data. The print data editing unit 208 performs necessary editing of the XPS data based on the print setting information, converts the XPS data into the PWG Raster data 303, and then transmits the data to the printing apparatus 102. The printing apparatus 102 performs printing based on the received data. However, in a case where the format of the print data interpretable by the printing apparatus 102 includes XPS data, the print data editing unit 208 may transmit the XPS data to the printing apparatus 102 without converting the XPS data into another format, thereby performing printing.

FIG. 4 is a flowchart illustrating a main processing procedure of editing processing of the print function information 203 by the print function expansion unit 207 in this print system. The print function expansion unit 207 will sometimes be described as the main constituent of each process but a corresponding function is actually implemented when the CPU 111 executes a corresponding program.

First, the OS starts the procedure shown in FIG. 4 by activating the print function expansion unit 207 at a timing of associating the expansion application 204 for the first time or the like. In step S401, the print function expansion unit 207 acquires the roll paper width information 211 held by the expansion application 204, and the process advances to step S402. In step S402, the print function expansion unit 207 acquires the PDC as the print function information 203 from the print data generation software 202, and the process advances to step S403. At this time, although not shown, the print function expansion unit 207 may end the processing in a case where the PDC already includes roll paper width information. For example, in a case where the print data generation software 202 supports a roll paper width as a standard function of the IPP, the roll paper width can directly be used as a roll paper width supported by the printing apparatus 102, and thus unnecessary processing need not be performed.

FIG. 5 is a view showing an example of the PDC. A PDC 501 includes information of a function (Feature) supported by the printing apparatus 102, and information of a set value (Option) in a given function. For example, information 502 shows that ISOA4 or Poster44×64 can be set as PageMediaSize (paper size). Information 503 shows that Plain (plain paper) or Photographic (photo paper) can be set as PageMediaType (paper type). The information 503 shows that Portrait (portrait) or Landscape (landscape) can be set as PageOrientation (an orientation of printing). The PDC shown in FIG. 5 includes no information indicating that a roll paper width can be set.

In step S403, the print function expansion unit 207 refers to the PageMediaSize (paper size) information 502 of the PDC acquired in step S402. Then, a largest value among values of MediaSizeWidth is held as a maximum paper size width (maximum width) supported by the printing apparatus 102. More specifically, referring to FIG. 5, among the paper sizes supported by the printing apparatus 102, MediaSizeWidth of ISOA4 is 210000 and MediaSizeWidth of Poster44×64 is 1117600. Note that the unit is 1/1000 mm. FIG. 5 does not illustrate some paper sizes but comparison is also performed with respect to other paper sizes. In this example, among the paper sizes, the largest paper size width is 1117600 of Poster44×64, which is decided as a maximum paper size width X. Steps S404 to S406 will be described in detail using the roll paper width information 211 shown in FIG. 7. The print function expansion unit 207 sequentially compares the roll paper width acquired from the roll paper width information 211 with the paper size width X from above in step S404. First, the print function expansion unit 207 compares 1524000 as the first roll paper width of "60 in roll" with the paper size width X.

In step S404, the print function expansion unit 207 compares the roll paper width information 211 acquired in step S401 with the paper size width X acquired in step S403. If the roll paper width is smaller than the paper size width X, the process advances to step S405. The print function expansion unit 207 adds the roll paper width to the PDC in step S405, and the process advances to step S406. On the other hand, if the roll paper width is larger than the paper size width X, the process advances to step S406 without performing any processing. In step S406, the print function expansion unit 207 determines whether check of all the roll paper widths is complete. If check of all the roll paper widths is complete, the processing of FIG. 4 ends. On the other hand, if a roll paper width to be processed remains, the processes from step S404 are repeated.

For example, first, the print function expansion unit 207 compares, with 1117600 as the paper size width X, 1524000 as the roll paper width of "60 in roll" acquired from the roll paper width information 211 in step S404. In this case, since X is smaller, the process advances to step S406.

In step S406, the print function expansion unit 207 determines whether check of all the roll paper widths of the roll paper width information 211 is complete. With reference to FIG. 7, the roll paper width information 211 includes the next roll paper width, and thus the process advances to step S404. Next, in step S404, the print function expansion unit 207 compares, with 1117600 as the paper size width X, 1371600 as the roll paper width of "54 in roll" acquired from the roll paper width information 211. In this case as well, since X is smaller, the process advances to step S406. With reference to FIG. 7, it is determined in step S406 that the roll paper width information 211 includes the next roll paper width, and thus the process advances to step S404. Next, in step S404, the print function expansion unit 207 compares, with 1117600 as the paper size width X, 1117600 as the roll paper width of "44 in roll" acquired from the roll paper width information 211. In this case as well, since the size is equal to X, the process advances to step S405. In step S405, in accordance with the description rule of the PDC, the print function expansion unit 207 adds the roll paper width using Roll44inch as the name, used in the PDC, of "44 in roll" acquired from the roll paper width information 211. More specifically, with reference to FIG. 6, <psk:JobRollWidth psf2: psftype="Feature"> representing the function of the roll paper width is added. After that, as its option, <ns0000: Roll44inch psf2: psftype="Option" psf2: default="false"/> is added. As described above, the print function expansion unit 207 continues the processes of steps S404 to S406 until check of all the roll paper widths acquired from the roll paper width information 211 is completed. When check of all the roll paper widths is complete, the processing of FIG. 4 ends. By executing such processing, it is possible to add, to the PDC, the roll paper width information corresponding to the drawing application 201 even in a case where the print data generation software 202 does not support the roll paper width.

FIG. 6 is a view showing an example of the PDC after editing by the flowchart of FIG. 4. In an edited PDC 601, information 602 representing a roll paper width is added by the processing in step S405. The information 602 shows that Roll44inch (roll paper with a 44-inch width), Roll42inch (roll paper with a 42-inch width), and Roll24inch (roll paper with a 24-inch width) can be set as JobRollWidth (roll paper width). Note that FIG. 6 does not illustrate other added information.

The print setting screen expansion unit 205 is invoked via the OS when the user instructs, on the drawing application 201, to display the print setting screen. FIG. 8 is a flowchart illustrating an example of processing of generating an item of a roll paper width dropdown list displayed by the print setting screen expansion unit 205. The print setting screen expansion unit 205 will sometimes be described as the main constituent of each process but a corresponding function is actually implemented when the CPU 111 executes a corresponding program. First, in step S801, the print setting screen expansion unit 205 acquires the information 602 representing the roll paper width as PrintCapabilities (PC) as the capability information of the printer generated based on the information of the PDC edited by the flowchart of FIG. 4. Then, the process advances to step S802. In step S802, the print setting screen expansion unit 205 adds, to the roll paper width dropdown list, the roll paper width described in the information 602 representing the roll paper width and acquired in step S801. At this time, if information corresponding to a custom roll paper width can be acquired in addition to the roll paper width information, the custom roll paper width may be added to the dropdown list to be set.

FIGS. 9A and 9B are views each showing an example of the roll paper width dropdown list displayed in a roll paper width 1008 of FIG. 10A by the print setting screen expansion unit 205. FIG. 9A is a view showing an example in which the printer supports the roll paper widths up to "60 in roll" (roll paper with a 60-inch width) in the roll paper width dropdown list displayed by the print setting screen expansion unit 205. FIG. 9B is a view showing an example in which the printer supports the roll paper widths up to "44 in roll" (roll paper with a 44-inch width) in the roll paper width dropdown list displayed by the print setting screen expansion unit 205. In FIG. 9B, since the information corresponding to the roll paper width of the custom size can be acquired in step S801, control for setting the custom size is added.

FIGS. 10A and 10B are views each showing an example of the print setting screen displayed by the print setting screen expansion unit 205. FIG. 10A is a view showing an example in a case where normal enlargement/reduction is performed on the print setting screen displayed by the print setting screen expansion unit 205. A print setting screen 1000 displays, based on the above-described PDC (or PC), a screen on which the print function can be designated by the print data generation software 202. Control items 1001 to 1013 are those for setting each print function by the user. With respect to the control item 1003, the user can set a desired enlarged/reduced printing method by selecting a radio button in an "enlarged/reduced printing" group box. The control item 1004 is a "fit output paper size" setting, and is a setting for performing enlargement/reduction in accordance with the output paper size selected in an "output paper size" dropdown list of the control item 1007. The expansion application 204 instructs, to the drawing application 201, a print region having completely the same size as the paper size set in the "paper size" of the control item 1001. The expansion application 204 further instructs the print data generation software 202 to perform enlargement/reduction in accordance with the output paper size selected in the "output paper size" dropdown list.

Furthermore, the control item 1006 is a "scaling" setting, and is a setting for performing enlargement/reduction in accordance with a scale designated by the user. The expansion application 204 instructs, to the drawing application 201, a print region having completely the same size as the paper size set in the "paper size" of the control item 1001. The expansion application 204 further instructs the print data generation software 202 to perform enlargement/reduction in accordance with the designated scale.

Furthermore, the control item 1005 is a "scale to fit roll paper width" setting, and is a setting for performing enlargement/reduction in accordance with a roll paper width selected in a "roll paper width" dropdown list of the control item 1008. The expansion application 204 instructs, to the drawing application 201, a print region having completely the same size as the paper size set in the "paper size" of the control item 1001. The expansion application 204 further instructs the print data generation software 202 to perform enlargement/reduction in accordance with the roll paper width selected in the "roll paper width" dropdown list of the control item 1008. A scale calculation method will be described later. The control item 1008 is the "roll paper width" dropdown list that is generated by the processing of FIG. 8.

FIG. 10B is a view showing an example in a case where borderless printing is performed on the print setting screen displayed by the print setting screen expansion unit 205. The control item 1002 is a "borderless printing" checkbox. If the user checks the control item 1002, a "borderless setting" button of the control item 1009 is enabled. Furthermore, the label of the "enlarged/reduced printing" group box of the control item 1003 shown in FIG. 10A changes to "borderless printing method", and the user can set a borderless printing method by selecting a radio button in the group box. The borderless printing is a technique in which the printing apparatus 102 receives print data slightly larger than the set paper size from the expansion application 204 and discharges ink based on the print data. Then, printing can be performed not to contaminate a platen or not to generate a white border due to a paper feed error or a cutting error by receiving ink not hitting on the end of the paper by an absorber such as an ink receiving hole or sponge provided in a specific width on the platen. The control item 1009 is a "borderless setting" button. In the "borderless setting" of the control item 1009, an amount of extension necessary for borderless printing can be set. This amount of extension is a setting for generating print data slightly larger than the above-described paper size. As an example, this embodiment will provide a description on the premise that 3 mm is added as the amount of extension to the whole circumference of the paper size. The control item 1010 is a "fit output paper size" setting. In the case of borderless printing, the expansion application 204 instructs, to the drawing application 201, a print region having completely the same size as the paper size set in the "paper size" of the control item 1001. The expansion application 204 further instructs the print data generation software 202 to perform enlargement/reduction in accordance with the size obtained by adding the amount of borderless extension set in the "borderless setting" of the control item 1009 to the output paper size selected in the "output paper size" dropdown list. That is, the print data generation software 202 creates data larger than the actual paper size including the amount of extension necessary for borderless printing by enlarging/reducing the data generated by the drawing application 201. Next, the expansion application 204 can send the print data to the printing apparatus 102, and perform borderless printing in accordance with the output paper size.

Furthermore, "print image with actual size" of the control item 1012 is a setting for performing borderless printing without enlarging/reducing document paper. In the case of borderless printing, the expansion application 204 instructs, to the drawing application 201, a print region obtained by adding the amount of borderless extension set in the "borderless setting" of the control item 1009 to the paper size set in the "paper size" of the control item 1001. That is, the drawing application 201 creates data larger than the actual paper size including the amount of extension necessary for borderless printing. Thus, the expansion application 204 can print an image with an actual size by sending the print data to the printing apparatus 102 without instructing the print data generation software 202 to enlarge/reduce the data.

Furthermore, "scale to fit roll paper width" of the control item 1011 is a setting for performing borderless printing in accordance with the roll paper width selected in the "roll paper width" dropdown list. In the case of borderless printing, the expansion application 204 instructs, to the drawing application 201, a print region having completely the same size as the paper size set in the "paper size" of the control item 1001. The expansion application 204 further instructs the print data generation software 202 to perform enlargement/reduction in accordance with the size obtained by adding the amount of borderless extension set in the "borderless setting" of the control item 1009 to the roll paper width selected in the "roll paper width" dropdown list of the control item 1008. A scale calculation method will be described later. That is, the print data generation software 202 creates data larger than the actual paper size including the amount of extension necessary for borderless printing by enlarging/reducing the data generated by the drawing application 201 in accordance with the roll paper width. Next, the expansion application 204 can send the print data to the printing apparatus 102, and perform borderless printing in accordance with the roll paper width.

Figure 11:
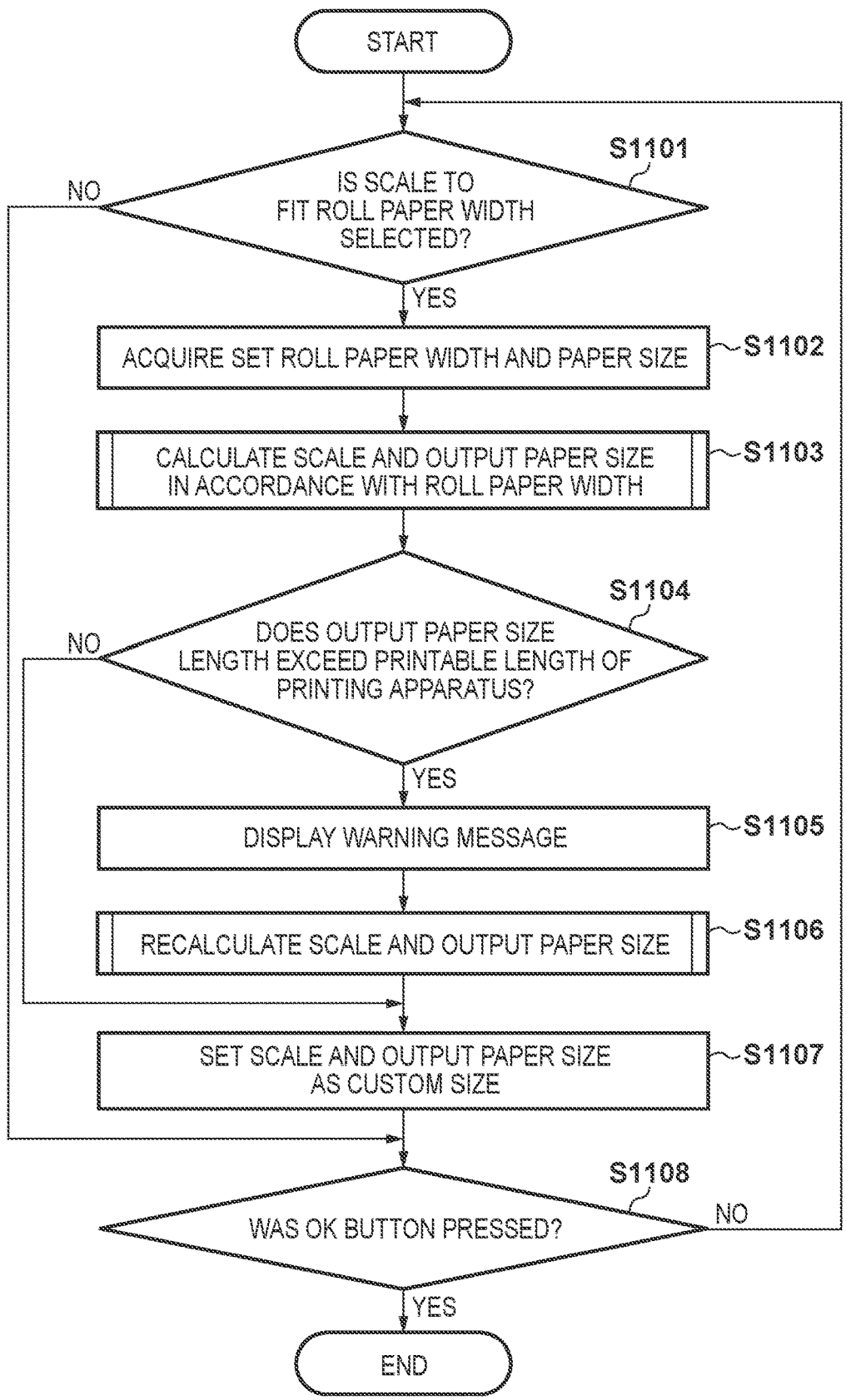
FIG. 11 is a flowchart illustrating processing by the print setting screen expansion unit.

FIG. 11 is a flowchart illustrating an example of processing by the print setting screen expansion unit 205. The print setting screen expansion unit 205 will sometimes be described as the main constituent of each process but a corresponding function is actually implemented when the CPU 111 executes a corresponding program. A description will be provided in a state in which borderless printing of the control item 1002 is not designated but the same processing is also performed at the time of borderless printing unless otherwise specified. In step S1101, if the "scale to fit roll paper width" radio button of the control item 1005 or the control item 1011 is selected, the print setting screen expansion unit 205 advances the process to step S1102. On the other hand, if the radio button is not selected, the print setting screen expansion unit 205 advances the process to step S1108. In step S1102, the print setting screen expansion unit 205 acquires the set roll paper width of the control item 1008 and the set paper size of the control item 1001. Next, in step S1103, the print setting screen expansion unit 205 calculates a scale and an output paper size in accordance with the roll paper width.

Figure 12B:
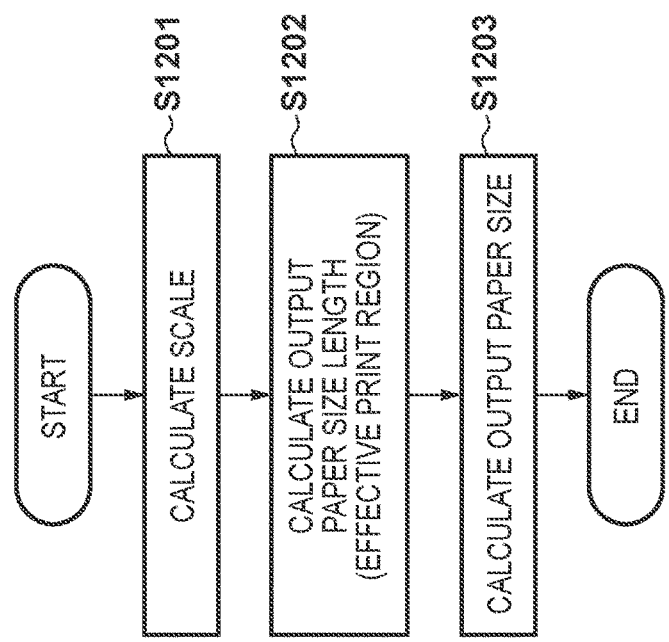
FIGS. 12A and 12B are a view and a flowchart showing processing by the print setting screen expansion unit.
Figure 12A:
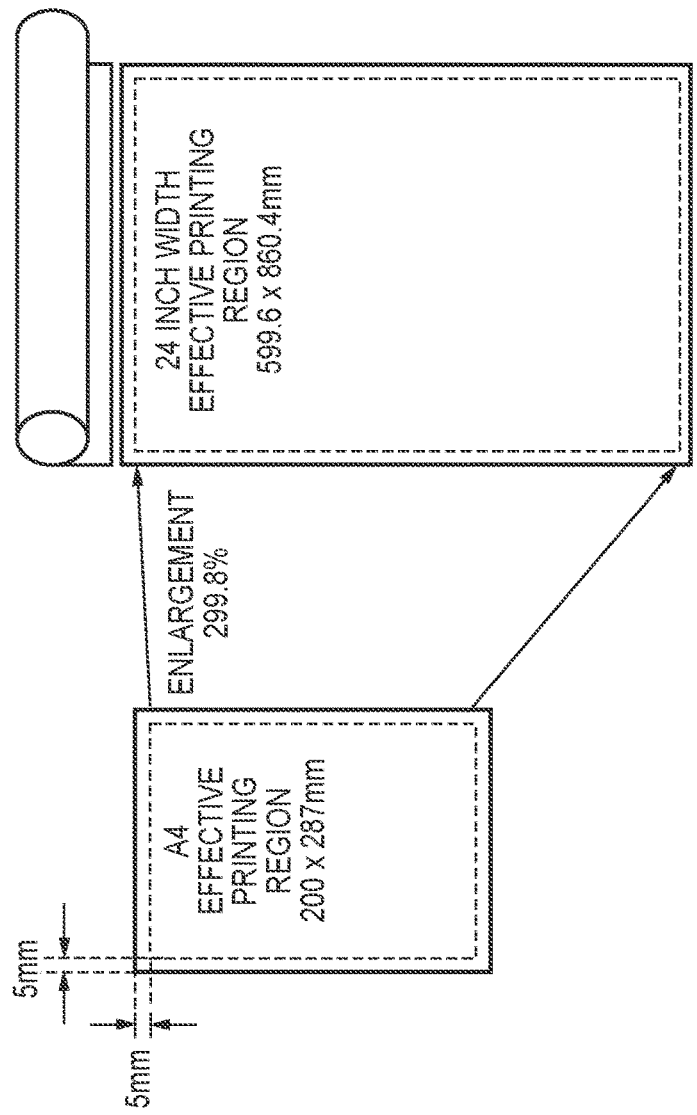

FIGS. 12A and 12B are a view and a flowchart for explaining an example of calculating the scale and the output paper size by the processing in step S1103 of the print setting screen expansion unit 205 in a case where "scale to fit roll paper width" is selected. FIG. 12A is a view showing an image when enlarging/reducing the paper size in accordance with the roll paper width. In this example, assume that the paper size set in the print setting screen expansion unit 205 is A4, the roll paper width is "24 in roll" (roll paper with a 24-inch width), and the margin of the printing apparatus 102 is 5 mm on the whole circumference. FIG. 12B is a flowchart illustrating the procedure of the calculation processing when enlarging/reducing the paper size in accordance with the roll paper width.

In step S1201, the print setting screen expansion unit 205 calculates the scale by "roll paper width (effective print region)/paper size width (effective printing region)". In this example, (609.6 mm−(5+5) mm)/(210.0 mm−(5+5) mm)×100=299.8%. Next, in step S1202, the print setting screen expansion unit 205 calculates the output paper size length (effective print region) by "paper size length (effective print region)×scale". In this example, 287.0 mm×299.8%=860.4 mm.

In step S1203, the print setting screen expansion unit 205 calculates the output paper size (width, length). In this example, the margin is added to the output paper size length (effective print region) calculated in step S1202, thereby obtaining (609.6 mm, 860.4+(5+5) mm)=(609.6 mm, 870.4 mm).

In a case where borderless printing is designated, the processing described in the control item 1011 of FIG. 10B is performed to calculate the scale and the output paper size. This example assumes that the amount of extension is 3 mm on the whole circumference. First, the print setting screen expansion unit 205 calculates the scale by "(roll paper width+amount of extension)/paper size width". In this example, (609.6 mm+(3+3) mm)/210.0 mm×100=293% is obtained. Then, the print setting screen expansion unit 205 calculates the output paper size length by "output paper size length×scale−amount of extension". In this case, 297.0× 293%−(3+3)=864.21 mm is obtained. Therefore, the output paper size (width, length) is (609.6 mm, 864.21 mm). After step S1203, the process advances to step S1104 of FIG. 11.

Next, in step S1104, the print setting screen expansion unit 205 determines whether the output paper size length (output length) exceeds the printable length of the printing apparatus 102. If it is determined in step S1104 that the output paper size length exceeds the printable length of the printing apparatus 102, the process advances to step S1105; otherwise, the process advances to step S1107. In step S1105, the print setting screen expansion unit 205 displays a warning message indicating that the printable length is exceeded, and advances the process to step S1106.

Figure 13:
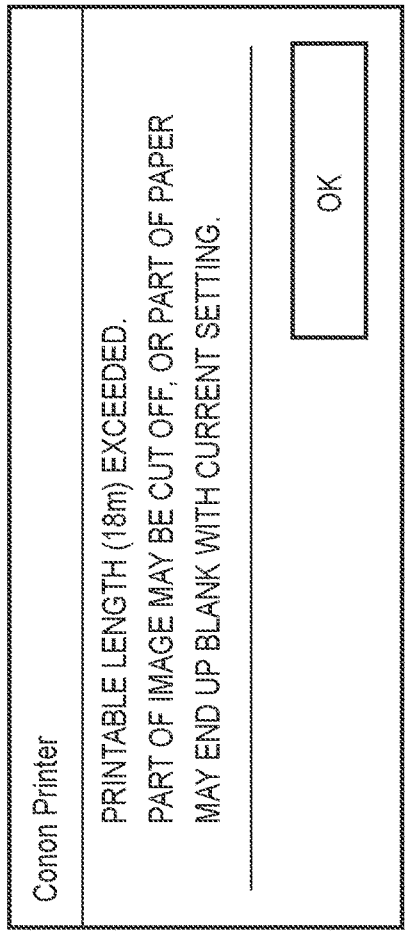
FIG. 13 is a view showing display by the print setting screen expansion unit.

FIG. 13 is a view showing an example of the warning message indicating that the printable length is exceeded, which is displayed by the print setting screen expansion unit 205. In this example, the printable length is 18 m but this printable length is model-dependent information different for each connected printing apparatus 102. Therefore, when the expansion application 204 is associated with the printing apparatus 102 for the first time, the print function expansion unit 207 may add the information of the printable length to the print function information 203. This allows the print setting screen expansion unit 205 to determine whether to display the warning message based on the information of the printable length of the printing apparatus 102. In this case, the warning message is displayed using the information of the printable length of the printing apparatus 102.

Next, in step S1106, the print setting screen expansion unit 205 recalculates the scale and the output paper size, and advances the process to step S1107.

Figure 14A:
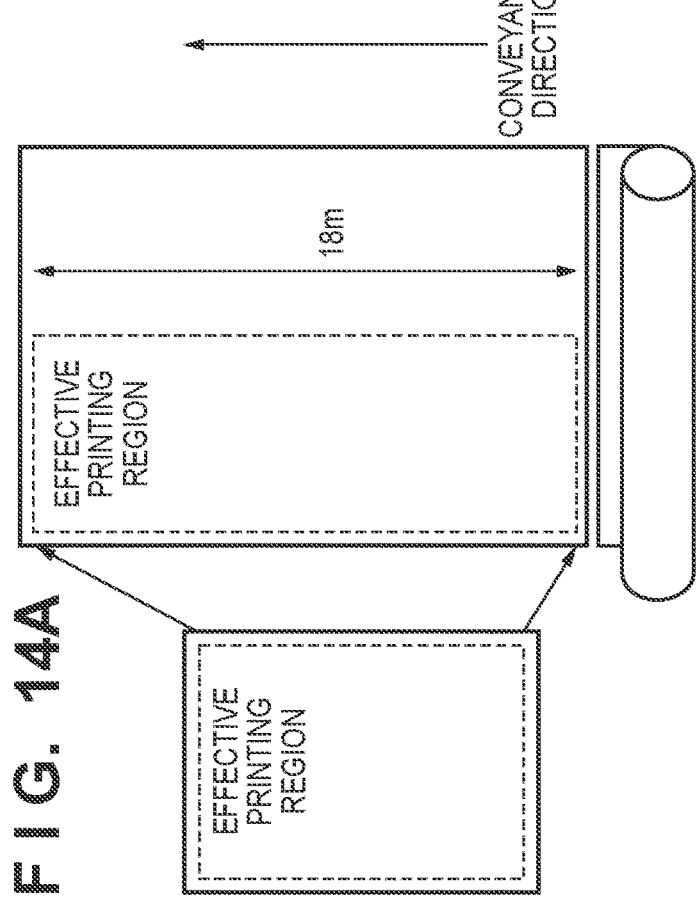
FIGS. 14A and 14B are a view and a flowchart showing display by the print setting screen expansion unit.
Figure 14B:
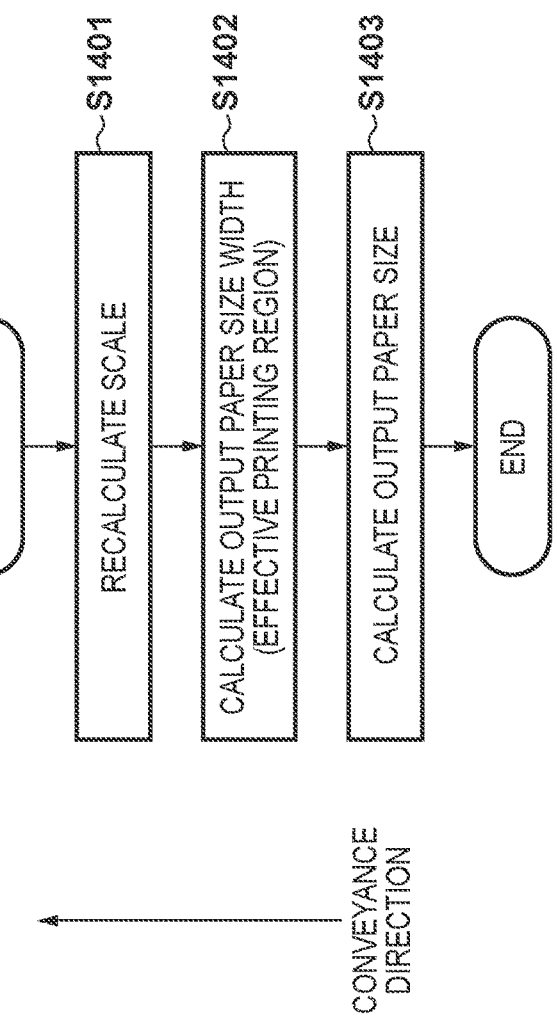

FIG. 14B is a flowchart illustrating the processing of recalculating the scale and the output paper size by the processing in step S1103 of the print setting screen expansion unit 205 since the printable length of the printing apparatus 102 is exceeded. FIG. 14A is a view showing an image of this. In a case where the length of the enlarged output paper size exceeds the upper limit of the paper length, the scale is adjusted so the length does not exceed the upper limit, and then the effective print region is arranged at the upper left position with respect to the conveyance direction of the paper. This example assumes that the paper size width and length set in the print setting screen expansion unit 205 are (100 mm, 3000 mm), the roll paper width is "24 in roll" (roll paper with a 24-inch width), and the margin of the printing apparatus 102 is 5 mm on the whole circumference. In this example, when the processing of FIG. 12B is performed, the scale is (609.6−(5+5))/(100−(5+5))×100=666%. Furthermore, the output paper size length (effective print region) is 3000×6.66=19980. As a result, the output paper size is (609.6, 19980+(5+5)), which exceeds 18 m.

FIG. 14B is a flowchart illustrating the procedure of the calculation processing of recalculating the scale and the output paper size in step S1106. In step S1401, the print setting screen expansion unit 205 calculates the scale by "printable length (effective print region)/paper size length (effective print region)". In this example, (18000 mm−(5+5) mm)/(3000 mm−(5+5) mm)×100=602% is obtained.

Next, in step S1402, the print setting screen expansion unit 205 calculates the output paper size width (effective print region) by "paper size width (effective print region)× scale". In this example, (100−(5+5))×6.02=541.8 is obtained. As a result, the width and length of the effective print region are (541.8 mm, 2990 mm×6.02).

Next, in step S1403, the print setting screen expansion unit 205 sets the output paper size length to be equal to the printable length, and sets the output paper size width to be equal to the roll paper width. In this example, the output paper size is given by (609.6 mm, 18000 mm).

In a case where borderless printing is designated, the processing of recalculating the scale and the output paper size in step S1106 is not performed so as to reliably perform borderless printing. Therefore, the print data is directly sent to the printing apparatus 102. The print data after 18 m from the head in the conveyance direction is cut by the printer, and is not thus printed. Note that recalculation is not performed in this example but the print setting screen expansion unit 205 may adjust the scale and the output paper size or an error may be made to occur in the printing apparatus 102 and printing cancelled.

Next, in step S1107, the print setting screen expansion unit 205 sets, as the print setting information (PT), the scale and the output paper size calculated in step S1103 or S1106. Next, in step S1108, the print setting screen expansion unit 205 determines whether an OK button of the control item 1013 is pressed. If it is determined that the OK button of the control item 1013 is pressed, the processing of FIG. 11 ends; otherwise, the processes from step S1101 are repeated. By executing the processing shown in FIG. 11, it is possible to set enlargement/reduction in accordance with the roll paper width added to the PDC, and to make a reset not to exceed the printable length of the printing apparatus 102.

Figure 15:
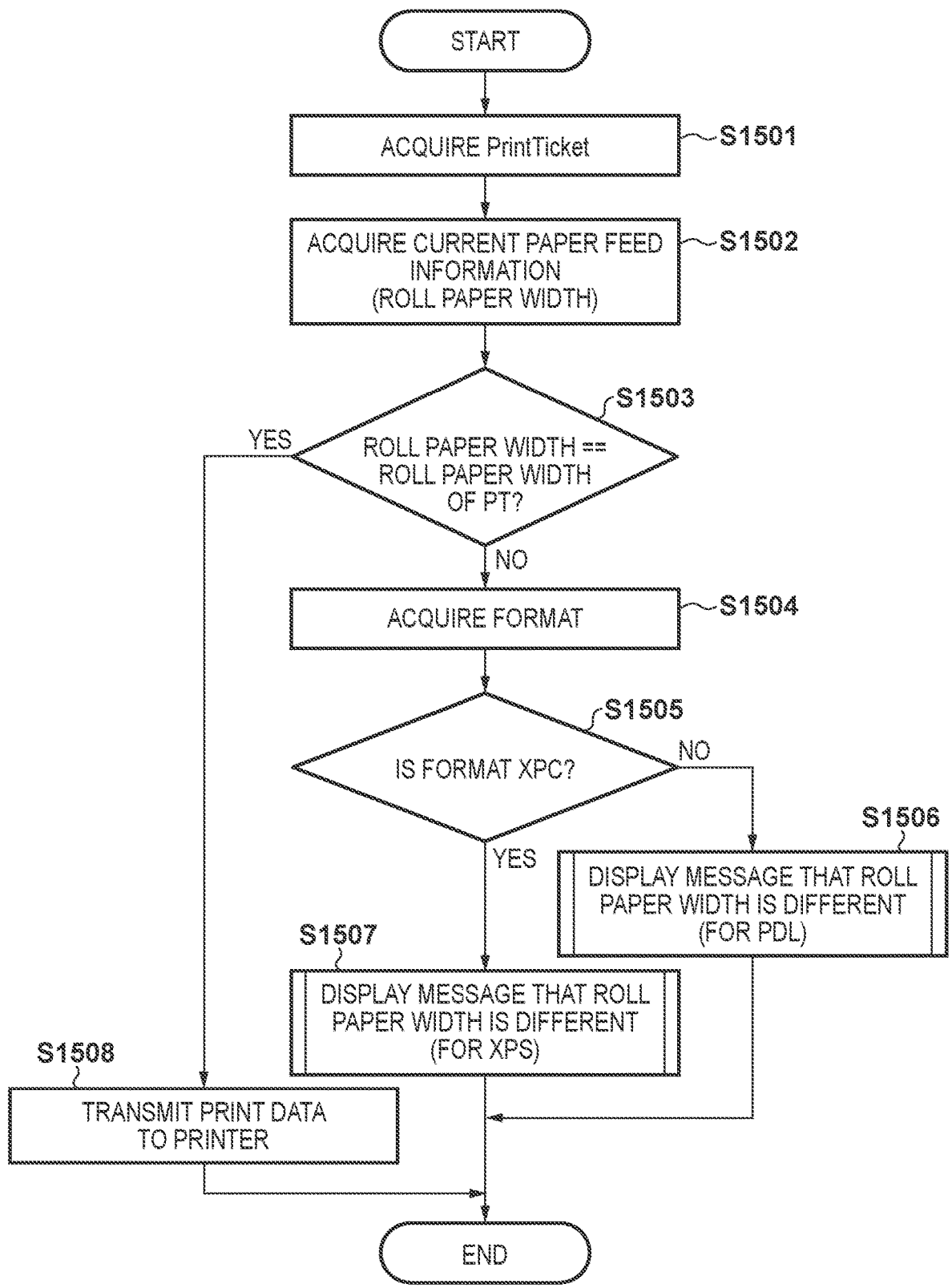
FIG. 15 is a flowchart illustrating processing by a print data editing unit.

FIG. 15 is a flowchart illustrating an example of processing by the print data editing unit 208. The print data editing unit 208 will sometimes be described as the main constituent of each process but a corresponding function is actually implemented when the CPU 111 executes a corresponding program.

The procedure shown in FIG. 15 is executed at a timing when output data from the print data generation software 202 can be processed. First, in step S1501, the print data editing unit 208 acquires the PT as the print setting information included in the print data as input data. Next, in step S1502, the print data editing unit 208 acquires information of the width of the roll paper currently fed from the printing apparatus 102. Next, in step S1503, the print data editing unit 208 determines whether the setting of the roll paper width of the PT acquired in step S1501 matches the roll paper width acquired in step S1502. If it is determined that these widths match each other, the process advances to step S1508. In step S1508, the print data editing unit 208 can correctly print on the roll paper set in the printing apparatus 102 in accordance with the roll paper width, and thus directly transmits the print data to the printer, thereby ending the processing of FIG. 15. On the other hand, if it is determined in step S1503 that the widths do not match each other, the process advances to step S1504. In step S1504, the print data editing unit 208 acquires the data format of the print data using the API of the OS. In this example, the API of the OS is used. However, the print data editing unit 208 may make determination by analyzing the print data, or the print data generation software 202 may add information to the output data and the print data editing unit 208 may make determination with reference to the information.

Next, in step S1505, the print data editing unit 208 determines whether the acquired input data format is the XPS format. If it is determined that the format is not the XPS format, the print data editing unit 208 advances the process to step S1506; otherwise, the print data editing unit 208 advances the process to step S1507. After step S1506 or S1507, the processing of FIG. 15 ends. Details of the processes in steps S1506 and S1507 will be described later.

By performing this processing, it is possible to compare the roll paper width actually set in the printing apparatus 102 with the roll paper width of the print data, and separate processing when the widths match each other and processing when the widths do not match each other. By confirming the format of the print data, it is possible to switch the processing in accordance with the format.

Figure 16:
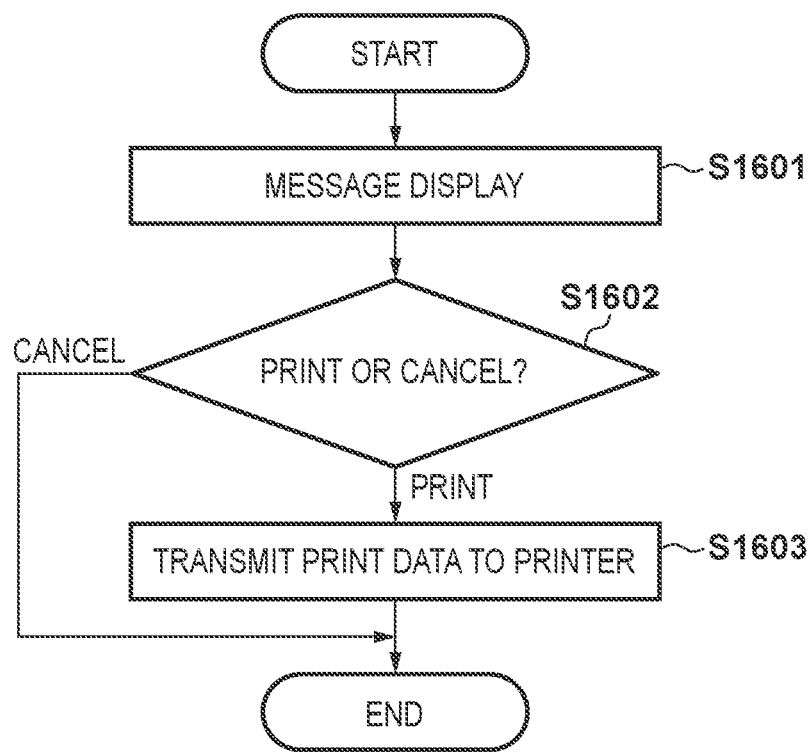
FIG. 16 is a flowchart illustrating the processing by the print data editing unit.

FIG. 16 is a flowchart illustrating an example of the procedure of message display processing (for PDL) of the print data editing unit 208 in step S1506. In this example, PWGRaster will be exemplified as the PDL. First, in step S1601, the print data editing unit 208 displays a message screen shown in FIG. 17.

Figure 17:
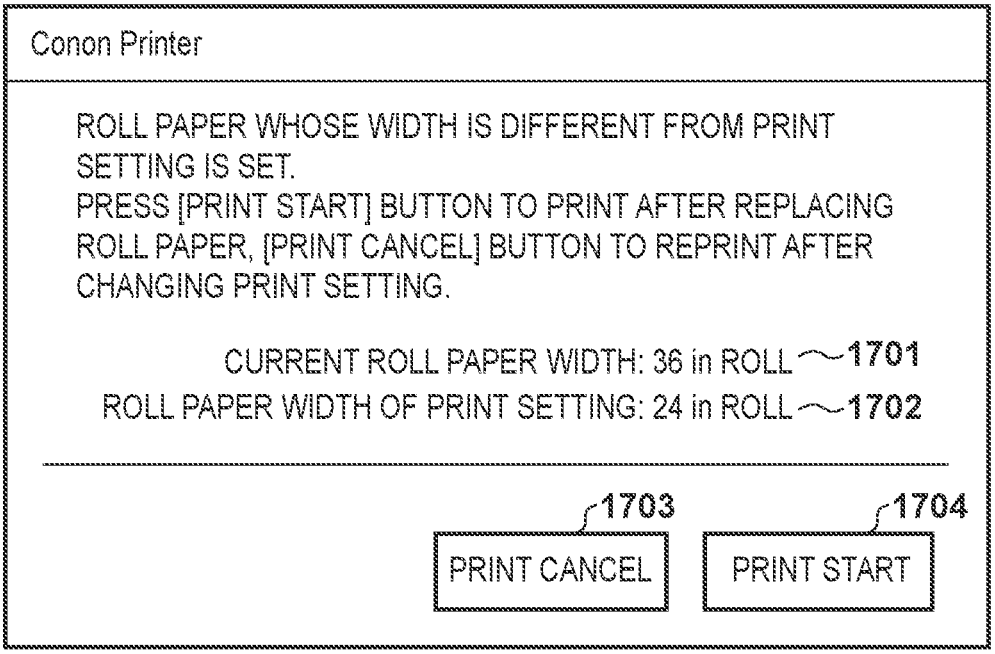
FIG. 17 is a view showing display by the print data editing unit.

FIG. 17 is a view showing an example of the message screen (for PDL) displayed by the print data editing unit 208 in step S1601. The message screen displays a message indicating that the roll paper with a roll paper width different from the print setting is set in the printing apparatus 102 and the roll paper width cannot directly, correctly be enlarged in accordance with the roll paper width. In information 1701, information of the roll paper width set in the printing apparatus 102 is displayed. The information 1701 is displayed based on the information acquired by the print data editing unit 208 in step S1502. Furthermore, in information 1702, information of the roll paper width of the print setting is displayed. The information 1702 is displayed based on the information acquired by the print data editing unit 208 in step S1501. A control item 1703 is a print cancel button. A control item 1704 is a print start button.

Next, in step S1602, the print data editing unit 208 determines which of the print cancel button 1703 or the print start button 1704 is pressed. If it is determined that the print cancel button 1703 is pressed, the processing of FIG. 16 ends without performing any processing. On the other hand, if it is determined that the print start button 1704 is pressed, the print data editing unit 208 transmits the print data to the printing apparatus 102, and ends the processing of FIG. 16.

By executing this processing, the user can change the roll paper set in the printing apparatus 102 to a roll paper with the roll paper width set in the print setting while the message is displayed, thereby performing printing. If the setting is incorrect, the user can cancel printing, and change the print setting.

Figure 18:
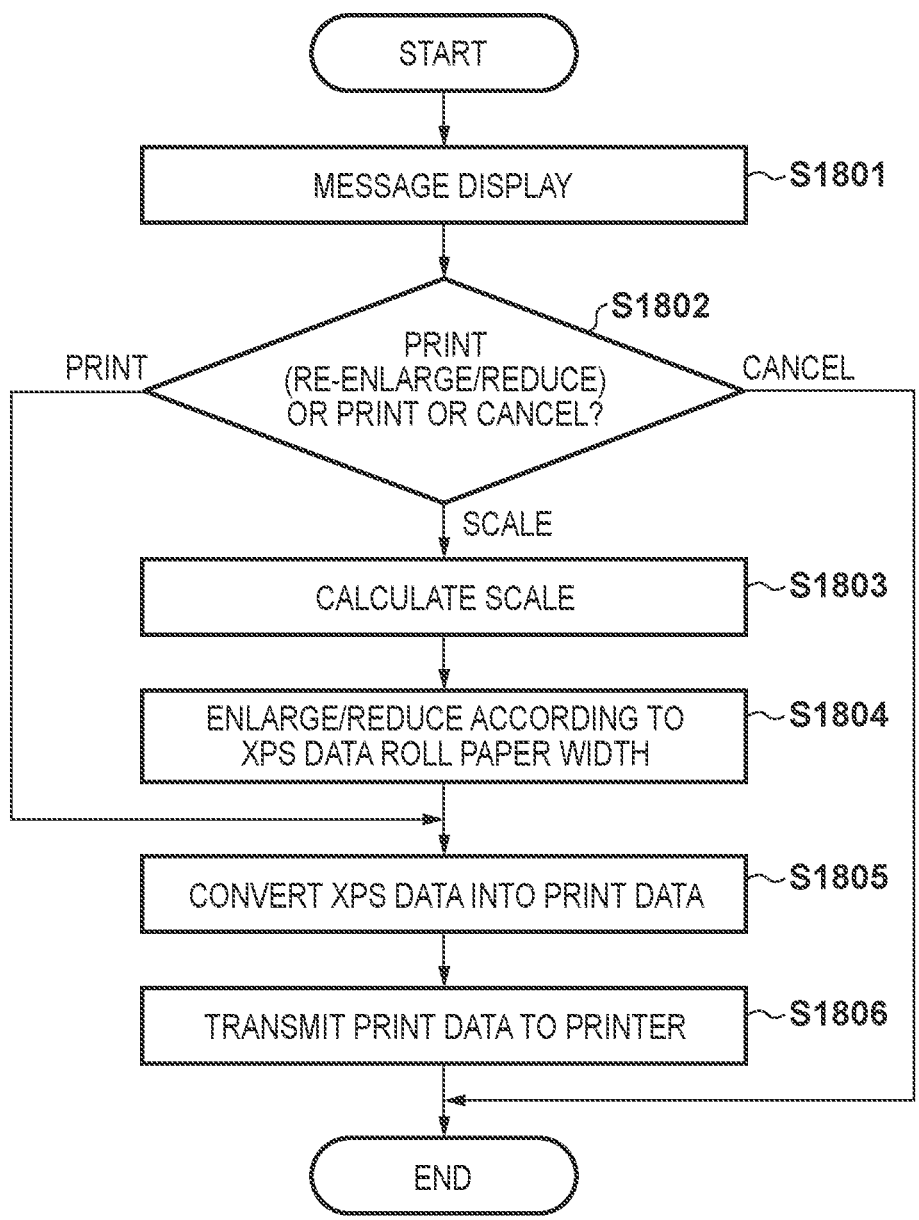
FIG. 18 is a flowchart illustrating the processing by the print data editing unit.

FIG. 18 is a flowchart illustrating an example of the procedure of message display processing (for XPS) of the print data editing unit 208 in step S1507. First, in step S1801, the print data editing unit 208 displays a message screen shown in FIG. 19.

Figure 19:
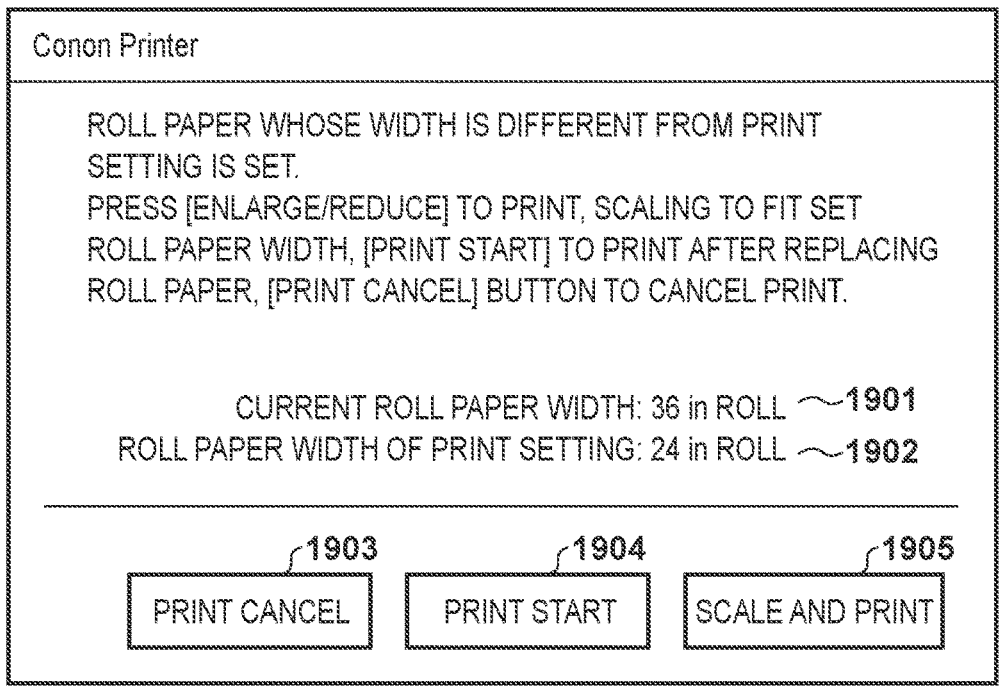
FIG. 19 is a view showing display by the print data editing unit.

FIG. 19 is a view showing an example of the message screen (for PDL) displayed by the print data editing unit 208 in step S1801. The message screen displays a message indicating that the roll paper with a roll paper width different from the print setting is set in the printing apparatus 102, whether to perform printing by performing enlargement/reduction in accordance with the set roll paper, and that the roll paper width cannot directly, correctly be enlarged in accordance with the roll paper width. Information 1901, information 1902, and control items 1903 and 1904 are the same as the information 1701, the information 1702, and the control items 1703 and 1704 of FIG. 17 and a description thereof will be omitted. A control item 1905 is a button for accepting an instruction to perform enlargement/reduction again in accordance with the roll paper set in the printing apparatus 102 and then start printing.

Next, in step S1802, the print data editing unit 208 determines which of the buttons is pressed on the message screen of FIG. 19. If it is determined that the print cancel button 1903 is pressed, the processing of FIG. 18 ends without performing any processing. If it is determined that the print start button 1904 is pressed, the process advances to step S1805. In step S1805, the print data editing unit 208 converts the XPS data into print data interpretable by the printing apparatus 102. Then, the process advances to step S1806, and the print data is transmitted to the printer, thereby ending the processing of FIG. 18. If it is determined in step S1802 that the "enlarged/reduced printing" button 1905 is pressed, the process advances to step S1803.

In step S1803, the print data editing unit 208 enlarges/reduces the XPS data in accordance with the roll paper width set in the printing apparatus 102 and acquired in step S1502. For example, assume that "24 in roll" (roll paper with a 24-inch width), that is, a width of 609.6 mm is set as the original roll paper width, and the actual roll paper width acquired in step S1502 is "36 in roll" (roll paper with a 36-inch width), that is, 914.4 mm. The scale is calculated by (actual roll paper width)/(original roll paper width)×100. In this example, 914.4 mm/609.6 mm×100=150% is obtained.

Next, in step S1804, the print data editing unit 208 enlarges/reduces the XPS data as input data at the scale calculated in step S1803. This example assumes that 1000 mm is set as the original length. In this case, the output paper size length is 1000 mm×1.5=1500 mm, and the output paper size (width, length) is (914.400 mm, 15000 mm). In this example, although not shown, it may be determined whether the printable length is exceeded, like in step S1104 of FIG. 11. This example also assumes that the print data editing unit 208 enlarges/reduces the XPS data using the API of the OS, as enlargement/reduction of the XPS data. However, the processing by the expansion application 204 may be performed again based on the scale and the paper size.

Next, in step S1805, the print data editing unit 208 converts the XPS data into print data interpretable by the printing apparatus 102. Note that if the printing apparatus 102 can interpret the XPS data, the print data editing unit 208 need not perform the processing in step S1805. Next, the print data editing unit 208 advances the process to step S1806, and transmits the print data to the printer, thereby ending the processing.

By executing this processing, in a case where the input data to the print data editing unit 208 is XPS data, it is possible to perform enlargement/reduction again even if the roll paper width in the print setting is different from the roll paper width of the currently set roll paper. Similar to the processing shown in FIG. 16, the user can change the roll paper set in the printing apparatus 102 to a roll paper with the roll paper width set in the print setting while the message screen is displayed, thereby performing printing. If the print setting is incorrect, the user can cancel printing, and change the print setting.

Second Embodiment

The second embodiment will be described below concerning points different from the first embodiment. In the first embodiment, the processing is switched in accordance with the format of the print data. However, by switching the format of print data in accordance with a print setting, it is possible to further improve user convenience.

Figure 20:
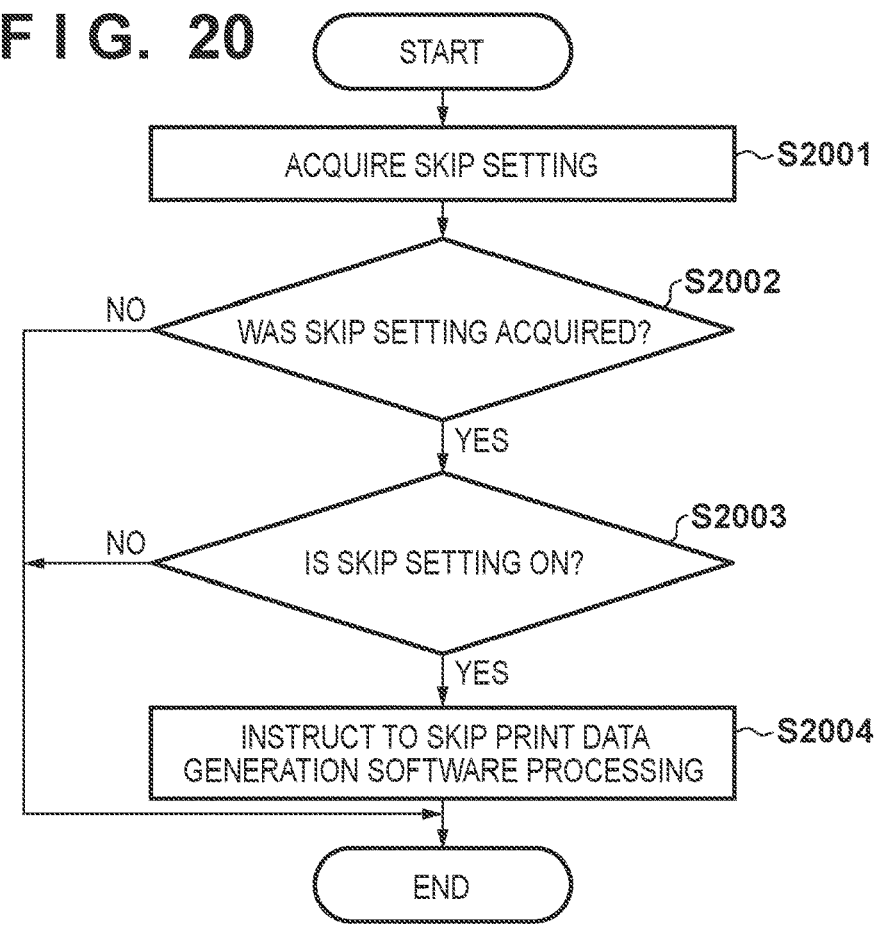
FIG. 20 is a flowchart illustrating processing by a skip control unit.

FIG. 20 is a flowchart illustrating an example of processing by a skip control unit 206. The skip control unit 206 will sometimes be described as the main constituent of each process but a corresponding function is actually implemented when a CPU 111 executes a corresponding program.

The procedure shown in FIG. 20 is executed at a timing when a drawing application 201 issues a print instruction. In step S2001, the skip control unit 206 acquires a skip setting from shared information 210. Next, in step S2002, the skip control unit 206 determines whether the skip setting is acquired. If it is determined in step S2002 that the skip setting is not acquired, the skip control unit 206 ends the processing of FIG. 20 without issuing a skip instruction. This causes print data generation software 202 to perform processing of converting intermediate data into print data, and thus input data processed by a print data editing unit 208 is the print data.

If it is determined in step S2002 that the skip setting is acquired, the skip control unit 206 advances the process to step S2003. In step S2003, the skip control unit 206 determines whether the acquired skip setting is ON. If it is determined in step S2003 that the skip setting is not ON, the skip control unit 206 ends the processing of FIG. 20 without issuing a skip instruction. This causes the print data generation software 202 to perform processing of converting intermediate data into print data, and thus the input data processed by the print data editing unit 208 is the print data.

If it is determined in step S2003 that the skip setting is ON, the skip control unit 206 advances the process to step S2004. In step S2004, the skip control unit 206 instructs to skip the processing of the print data generation software 202. After that, the processing of FIG. 20 ends. Thus, the print data generation software 202 does not perform processing of converting intermediate data into print data, and the input data processed by the print data editing unit 208 is the intermediate data. Note that in FIG. 20, an instruction to skip a default operation in a case where the skip setting is not stored is not issued. However, a skip instruction may be issued. With the above processing, whether to skip the processing of the print data generation software 202 is switched based on the skip setting in the shared information 210.

Figure 21:
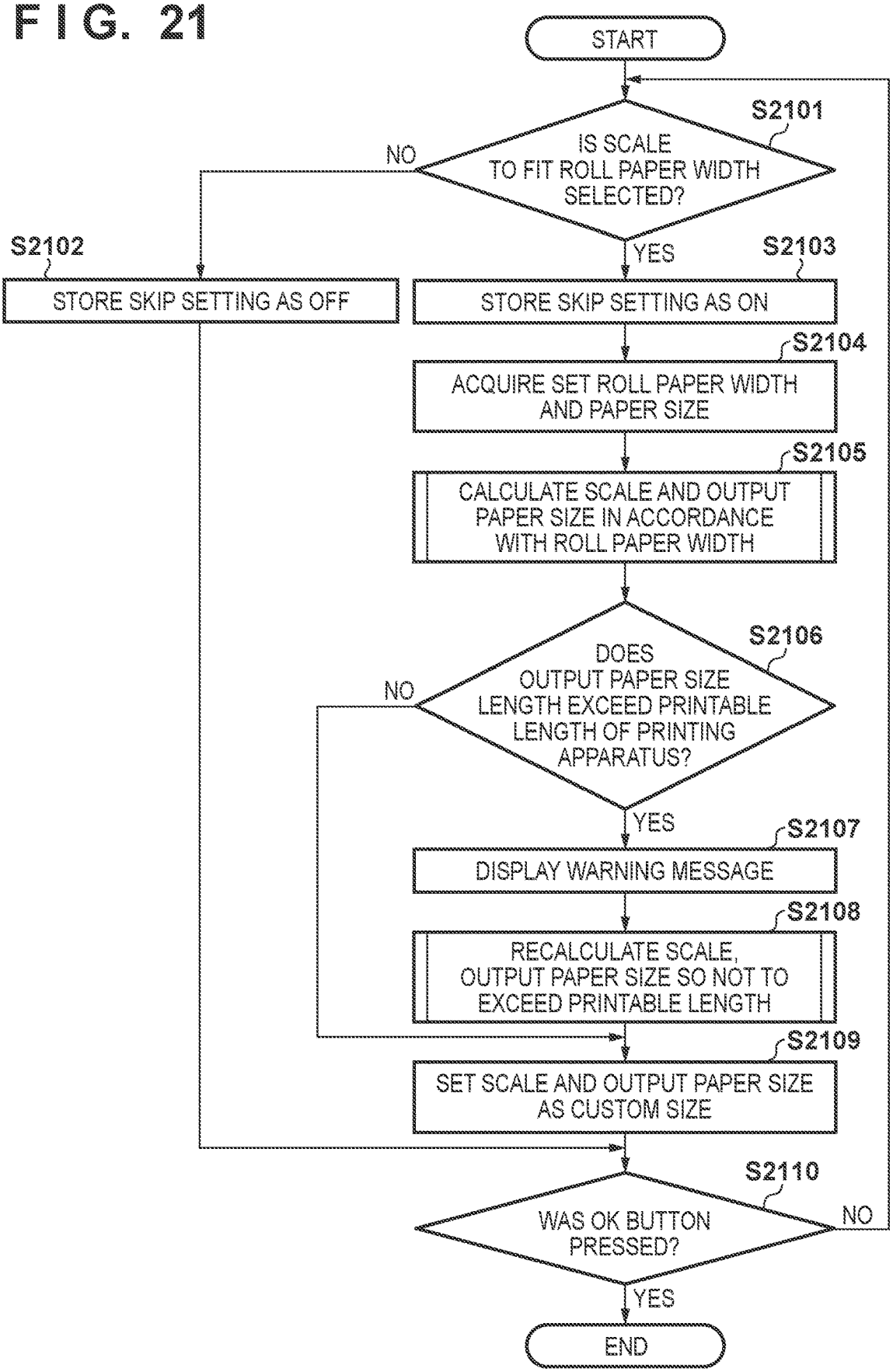
FIG. 21 is a flowchart illustrating processing by a print setting screen expansion unit.

FIG. 21 is a flowchart illustrating an example of processing of a print setting screen expansion unit 205 according to this embodiment. The print setting screen expansion unit 205 will sometimes be described as the main constituent of each process but a corresponding function is actually implemented when the CPU 111 executes a corresponding program.

First, if "scale to fit roll paper width" is selected in step S2101, the print setting screen expansion unit 205 advances the process to step S2103. In step S2103, the print setting screen expansion unit 205 stores the skip setting as ON in the shared information 210. On the other hand, if "scale to fit roll paper width" is not selected in step S2101, the process advances to step S2102. In step S2102, the print setting screen expansion unit 205 stores the skip setting as OFF in the shared information 210. Processes in steps S2104 to S2110 are the same as those in steps S1102 to S1108 of FIG. 11 and a description thereof will be omitted.

By executing this processing, an expansion application 204 can receive intermediate data in a case where "scale to fit roll paper width" is selected on the screen shown in FIG. 10A or 10B. Thus, in a case where the print data editing unit 208 determines that the current roll paper width is different from the print setting at the time of execution of printing, it is possible to perform enlargement/reduction again.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-014859, filed Feb. 2, 2023, which is hereby incorporated by reference herein in its entirety.

What is claimed is:

1. An information processing apparatus comprising:
at least one memory and at least one processor which function as:
an acquisition unit configured to acquire print function information for allowing a user to designate a function of a printing apparatus;
a first editing unit configured to edit the print function information acquired by the acquisition unit;
a generation unit configured to generate, based on the print function information edited by the first editing unit, print setting information for executing the function designated by the user, and
a storage unit configured to store information of a print medium,
wherein the first editing unit adds the information of the print medium stored in the storage unit to the print function information acquired by the acquisition unit,
the print medium includes roll paper, and
the first editing unit adds, to the print function information acquired by the acquisition unit, information of roll paper having a width smaller than a maximum width of paper included in the print function information acquired by the acquisition unit in the information of the roll paper stored in the storage unit.

2. The apparatus according to claim 1, further comprising a display unit configured to display, based on the print function information edited by the first editing unit, a setting screen on which the user can designate the function.

3. The apparatus according to claim 2, wherein on the setting screen, the information of the roll paper added by the first editing unit is displayed to be designatable.

4. The apparatus according to claim 3, further comprising a calculation unit configured to calculate a scale in a case where the function designated based on the print function information edited by the first editing unit is enlargement/reduction to the roll paper designated by the user.

5. The apparatus according to claim 4, further comprising a determination unit configured to determine whether an output length obtained by the scale calculated by the calculation unit exceeds a printable length of the printing apparatus,
wherein in a case where the determination unit determines that the printable length of the printing apparatus is exceeded, the calculation unit calculates a scale based on the printable length of the printing apparatus, and
the generation unit generates, as the print setting information, the scale calculated by the calculation unit.

6. The apparatus according to claim 4, wherein the print setting information generated by the generation unit is transferred to a printer driver.

7. The apparatus according to claim 6, further comprising:
a second acquisition unit configured to acquire output data output from the printer driver; and
a second editing unit configured to edit the output data acquired by the second acquisition unit.

8. The apparatus according to claim 7, further comprising a determination unit configured to determine whether the roll paper designated based on the print function information edited by the first editing unit and used in a print setting is different from roll paper set in the printing apparatus,
wherein in a case where the determination unit determines that the designated roll paper is different from the set roll paper, the second editing unit edits the output data.

9. The apparatus according to claim 8, wherein editing by the second editing unit is enlargement/reduction to the roll paper set in the printing apparatus.

10. The apparatus according to claim 9 further comprising a notification unit configured to make, in a case where the determination unit determines that the designated roll paper is different from the set roll paper, a notification that the roll paper designated based on the print function information edited by the first editing unit and used in the print setting is different from the roll paper set in the printing apparatus.

11. The apparatus according to claim 10, wherein the notification unit makes contents of a notification different between a case where a format of the output data is a first format and a case where the format of the output data is a second format.

12. The apparatus according to claim 11, wherein in a case where the format of the output data is the first format, the notification unit does not perform display for accepting an enlargement/reduction instruction of the output data, and in a case where the format of the output data is the second format, the notification unit performs display for accepting an enlargement/reduction instruction to the roll paper set in the printing apparatus.

13. The apparatus according to claim 12, wherein in a case where the enlargement/reduction instruction is accepted, the second editing unit performs enlargement/reduction to the roll paper set in the printing apparatus based on the output data.

14. The apparatus according to claim 11, further comprising a switching unit configured to switch the format of the output data output from the printer driver between the first format and the second format.

15. The apparatus according to claim 14, wherein
the printer driver executes conversion from the second format into the first format, and
the switching unit switches the format of the output data output from the printer driver between the first format and the second format in accordance with whether to execute the conversion.

16. The apparatus according to claim 11, wherein data in the second format is vector data.

17. The apparatus according to claim 11, wherein data in the first format is raster data.

18. The apparatus according to claim 7, further comprising a transmission unit configured to transmit the output data edited by the second editing unit to the printing apparatus.

19. The apparatus according to claim 6, wherein the printer driver is a class driver.

20. A non-transitory computer-readable storage medium storing a program configured to cause a computer to function to:
acquire print function information for allowing a user to designate a function of a printing apparatus;
edit the acquired print function information;
generate, based on the edited print function information, print setting information for executing the function designated by the user,
store information of a print medium,
wherein the information of the stored print medium is added to the acquired print function information, and
the print medium includes roll paper, and
add, to the acquired print function information, information of roll paper having a width smaller than a maximum width of paper included in the acquired print function information in the stored information of the roll paper.

21. The medium according to claim 20, wherein the program is an application program configured to expand a function of a printer driver.

22. A method executed by an information processing apparatus, comprising:
acquiring print function information for allowing a user to designate a function of a printing apparatus;
editing the acquired print function information;
generating, based on the edited print function information, print setting information for executing the function designated by the user,
storing information of a print medium,
wherein the stored information of the print medium is added to the acquired print function information, and
the print medium includes roll paper, and
adding, to the acquired print function information, information of roll paper having a width smaller than a maximum width of paper included in the acquired print function information in the stored information of the roll paper.

* * * * *